(12) United States Patent
Schwarzbauer et al.

(10) Patent No.: US 12,072,984 B2
(45) Date of Patent: Aug. 27, 2024

(54) METHOD AND SYSTEM FOR REAL TIME DETECTION AND PRIORITIZATION OF COMPUTING ASSETS AFFECTED BY PUBLICLY KNOWN VULNERABILITIES BASED ON TOPOLOGICAL AND TRANSACTIONAL MONITORING DATA

(71) Applicant: Dynatrace LLC, Waltham, MA (US)

(72) Inventors: Christian Schwarzbauer, Linz (AT); Andreas Berger, Hellmonsoedt (AT)

(73) Assignee: Dynatrace LLC, Waltham, MA (US)

( * ) Notice: Subject to any disclaimer, the term of this patent is extended or adjusted under 35 U.S.C. 154(b) by 81 days.

(21) Appl. No.: 17/475,449

(22) Filed: Sep. 15, 2021

(65) Prior Publication Data
US 2022/0156383 A1 May 19, 2022

Related U.S. Application Data

(60) Provisional application No. 63/079,543, filed on Sep. 17, 2020.

(51) Int. Cl.
| | |
|---|---|
| *G06F 21/00* | (2013.01) |
| *G06F 21/54* | (2013.01) |
| *G06F 21/55* | (2013.01) |
| *G06F 21/56* | (2013.01) |
| *G06F 21/57* | (2013.01) |

(52) U.S. Cl.
CPC ............ *G06F 21/577* (2013.01); *G06F 21/54* (2013.01); *G06F 21/554* (2013.01); *G06F 21/566* (2013.01)

(58) Field of Classification Search
CPC ...... G06F 21/566; G06F 21/554; G06F 21/54; G06F 21/577

USPC ........................................................... 726/22
See application file for complete search history.

(56) References Cited

U.S. PATENT DOCUMENTS

| | | |
|---|---|---|
| 9,754,105 B1 * | 9/2017 | López-Chicheri ...... G06F 21/55 |
| 9,811,362 B2 | 11/2017 | Greifeneder et al. |
| 10,229,251 B1 * | 3/2019 | Dalessio ................... G06F 8/71 |

(Continued)

FOREIGN PATENT DOCUMENTS

CN         111191248 A       5/2020

*Primary Examiner* — Josnel Jeudy
(74) *Attorney, Agent, or Firm* — Harness, Dickey & Pierce, P.L.C.

(57) ABSTRACT

A technology is disclosed to perform real-time and online identification and prioritization of vulnerabilities of components of software applications. Agents are deployed to components of monitored applications that monitor and report application topology, communication, code execution and code loading activity. Reported code loading and execution activity data is used to detect the loading and execution of vulnerable code, topology and communication data is used to create a topology model of the application containing communication paths, trust boundaries and location of sensitive data. The analysis of code loading and execution data reveals the extend to which vulnerable code is used by monitored application components. The topology data combined with code execution data reveals the extent to which components executing vulnerable code are exposed to untrusted entities and/or accessing sensitive data. Execution data of vulnerable code, exposure and access data of components executing the vulnerable code are used to calculate priority scores for identified vulnerabilities.

24 Claims, 17 Drawing Sheets

(56) References Cited

U.S. PATENT DOCUMENTS

| | | | |
|---|---|---|---|
| 2006/0282529 A1* | 12/2006 | Nordin | H04L 43/0811 |
| | | | 709/224 |
| 2014/0165204 A1* | 6/2014 | Williams | G06F 21/55 |
| | | | 726/25 |
| 2016/0105350 A1 | 4/2016 | Greifeneder et al. | |
| 2017/0208093 A1* | 7/2017 | Williams | H04L 67/02 |
| 2019/0266502 A1 | 8/2019 | Moser et al. | |
| 2020/0195735 A1 | 6/2020 | Greifeneder et al. | |
| 2020/0242254 A1 | 7/2020 | Velur et al. | |
| 2022/0207142 A1* | 6/2022 | Gupta | G06F 21/52 |

\* cited by examiner

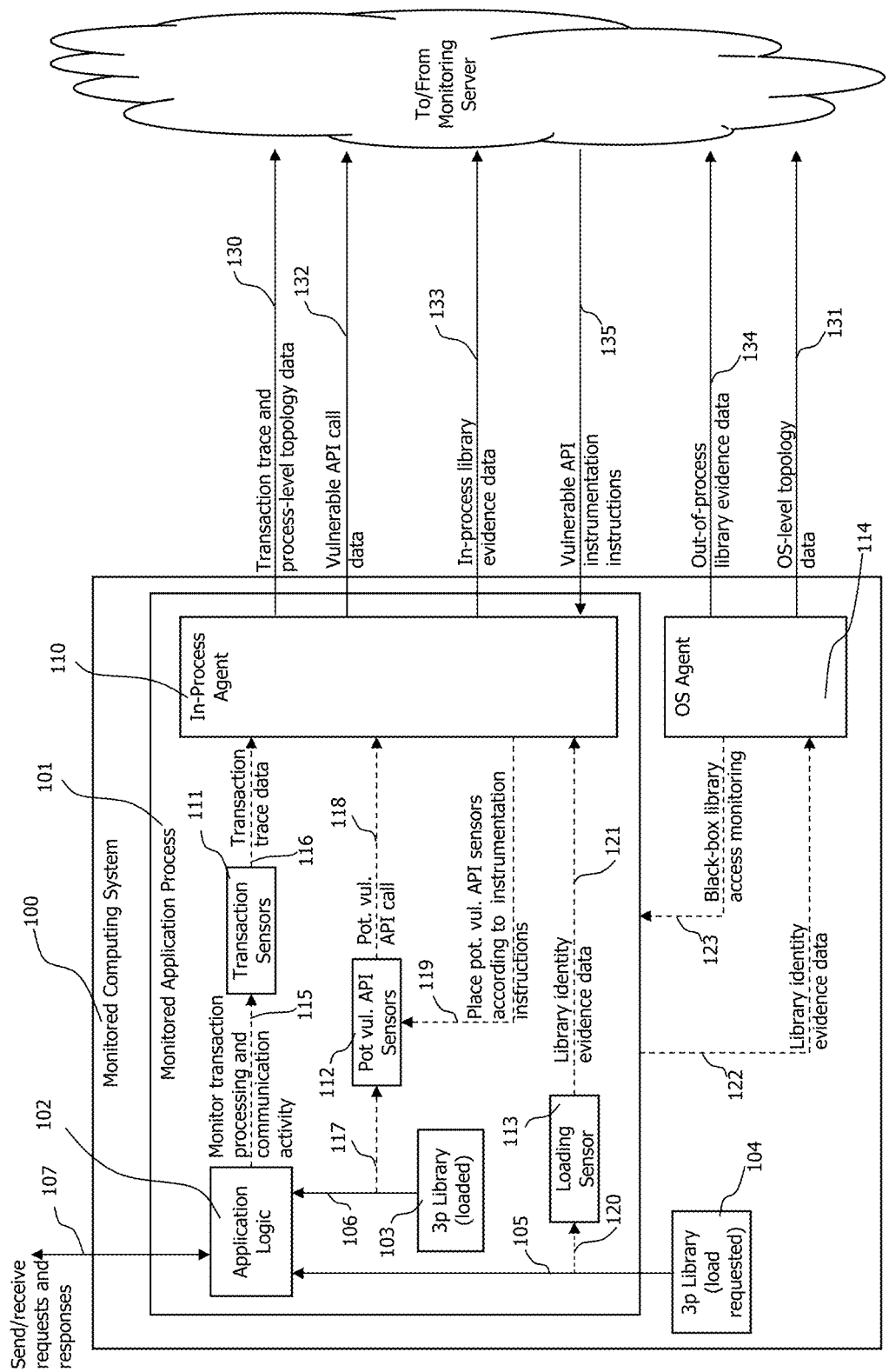
FIG 1a: System Overview – Agent Side

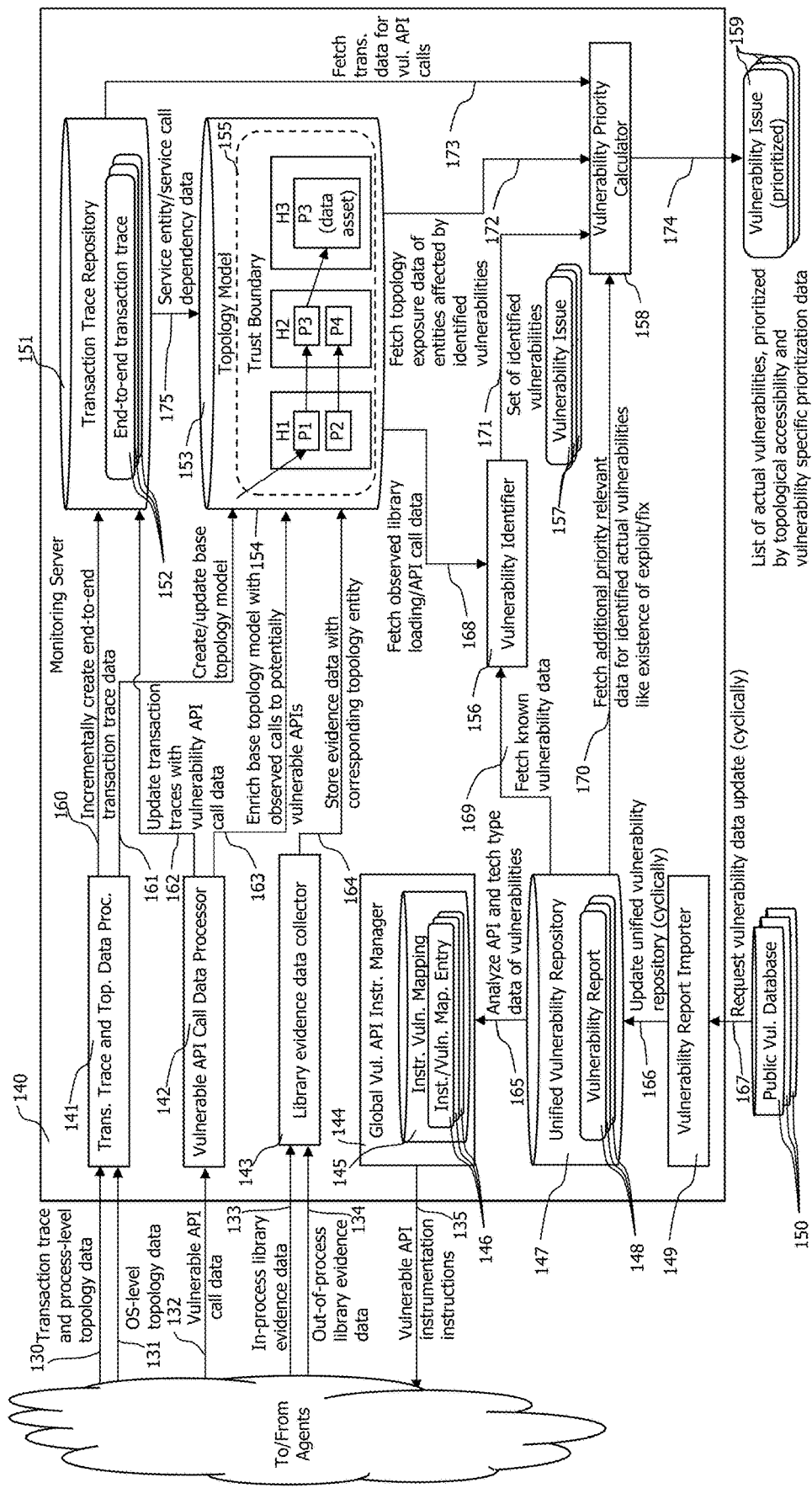
FIG 1b: System Overview

Agent/Monitoring Server Data Transfer Records
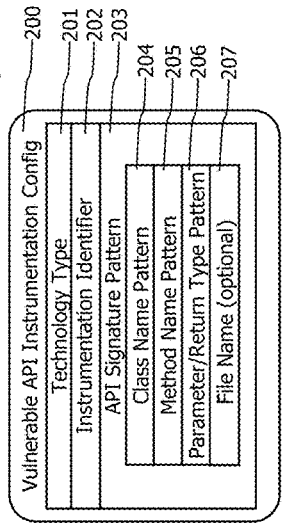
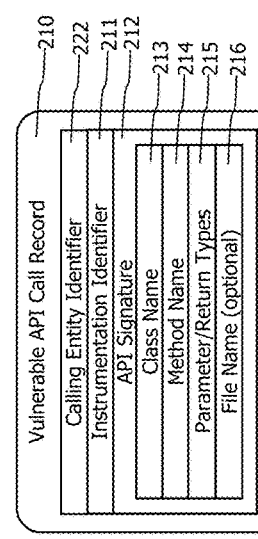
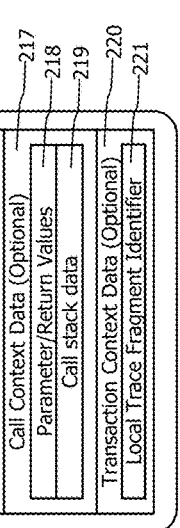
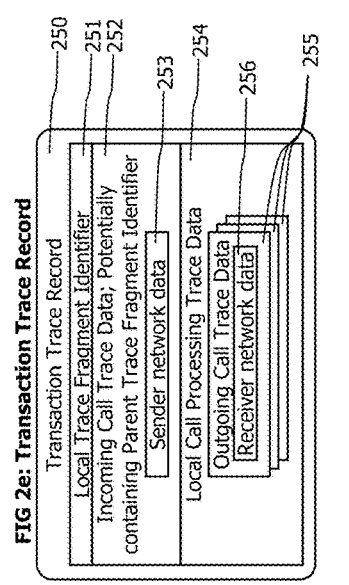

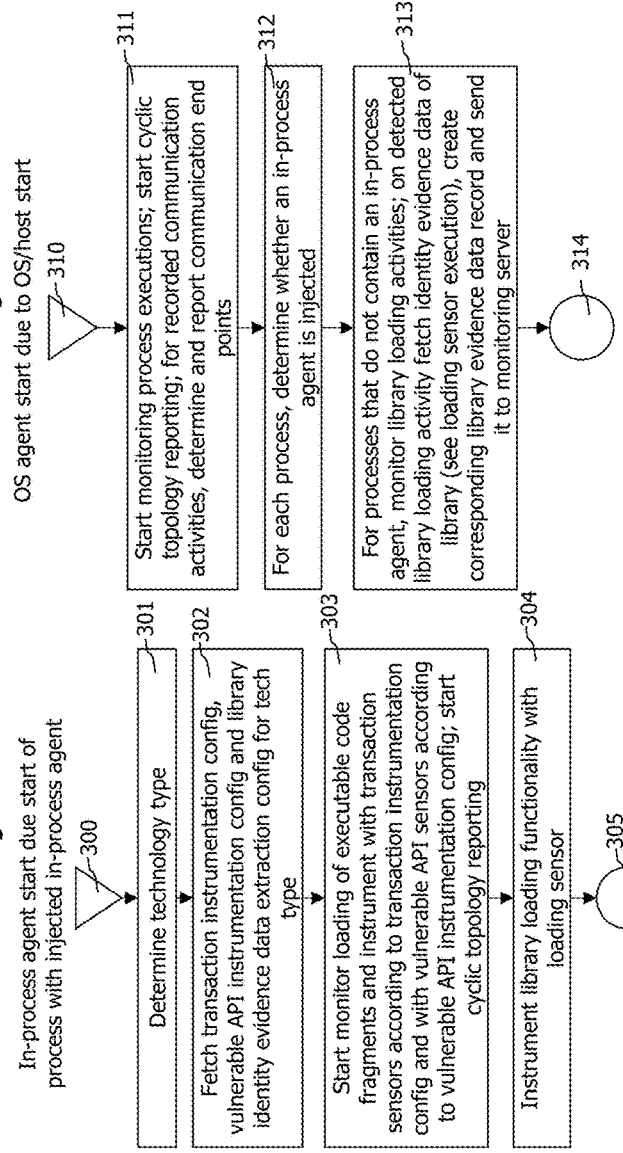

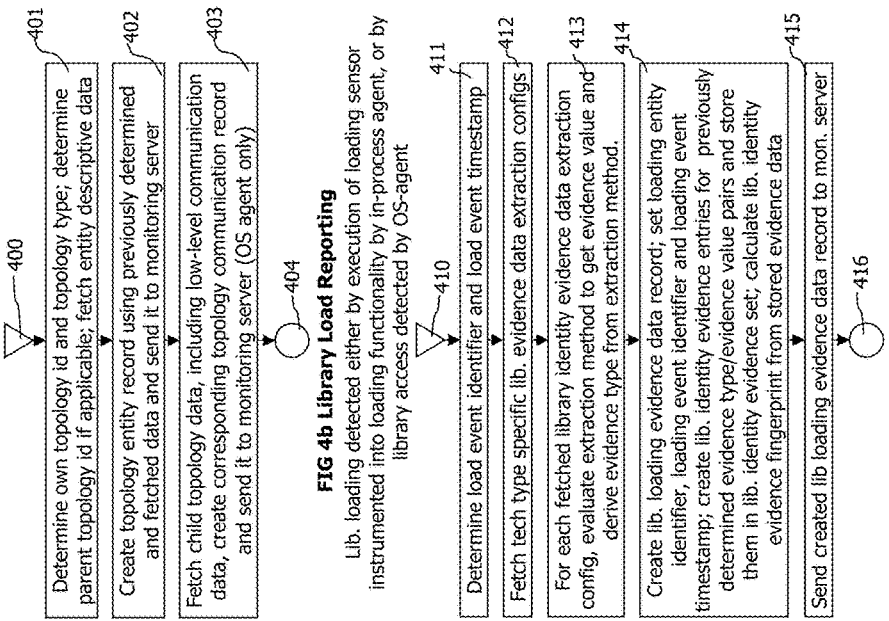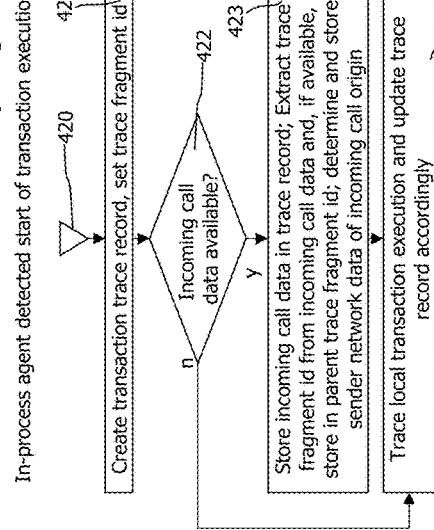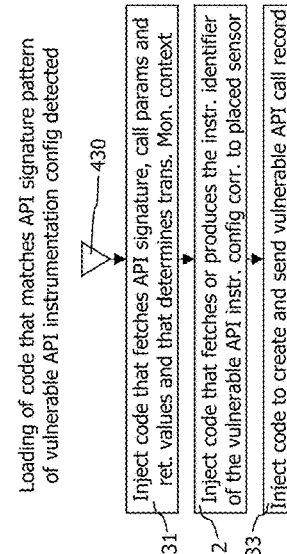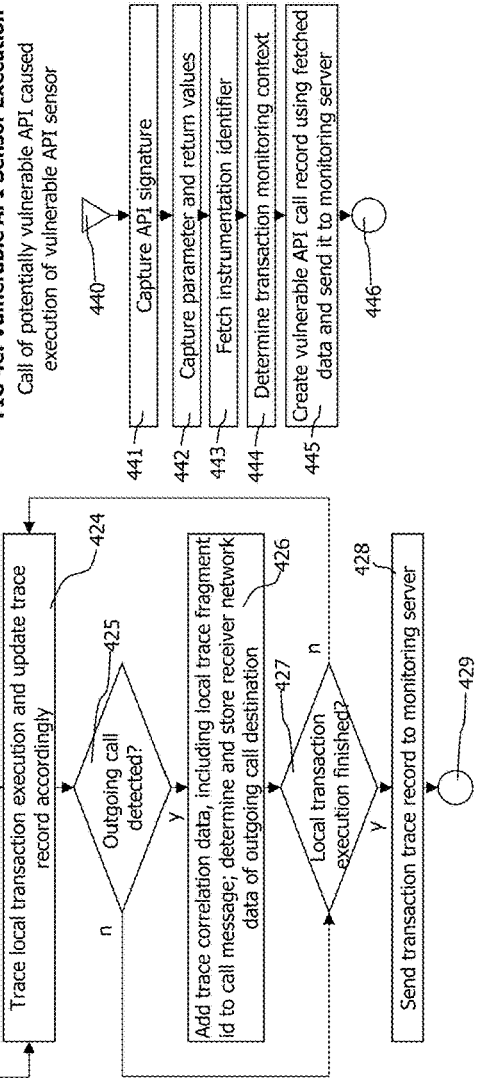

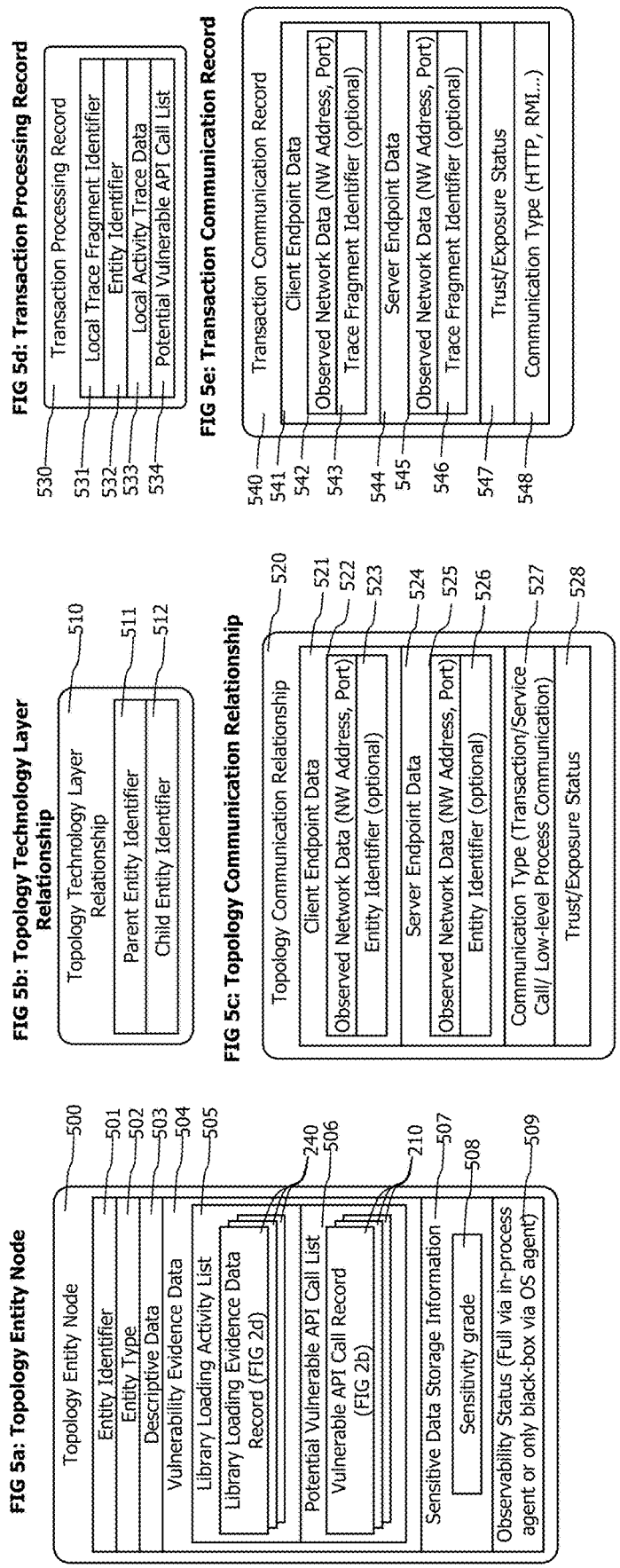

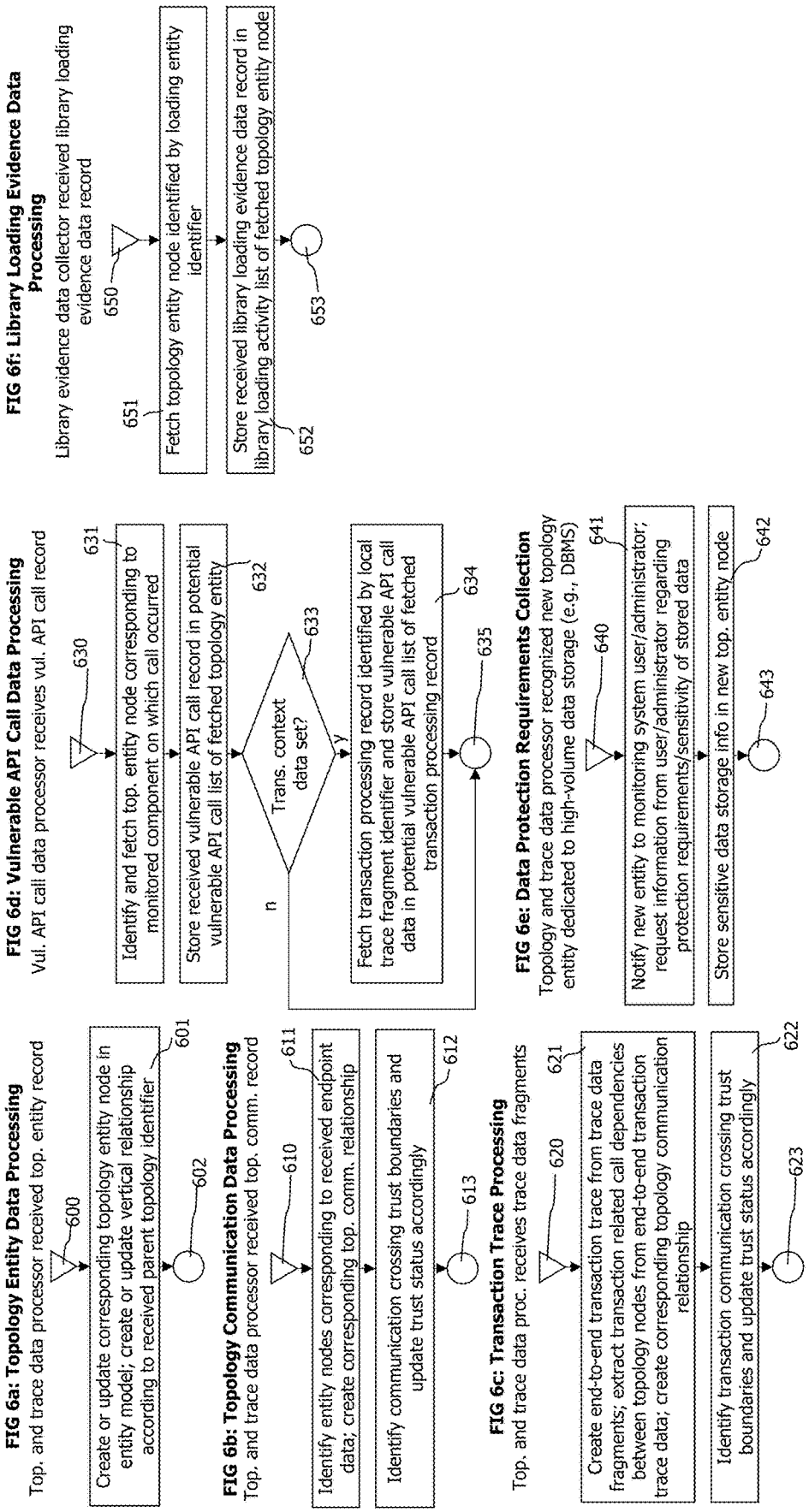

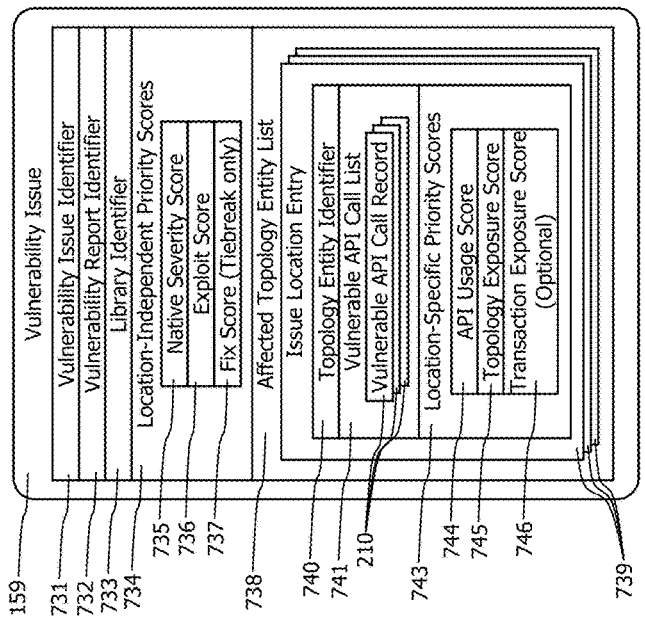
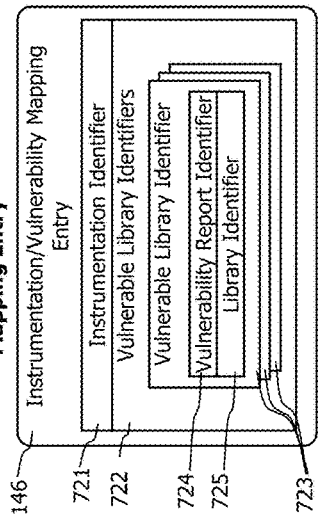
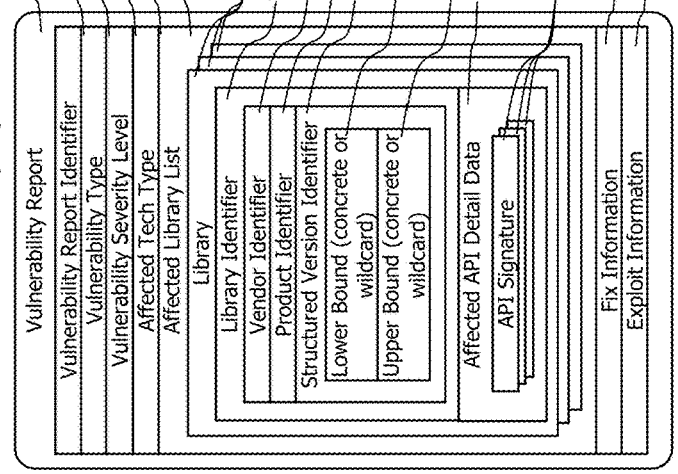

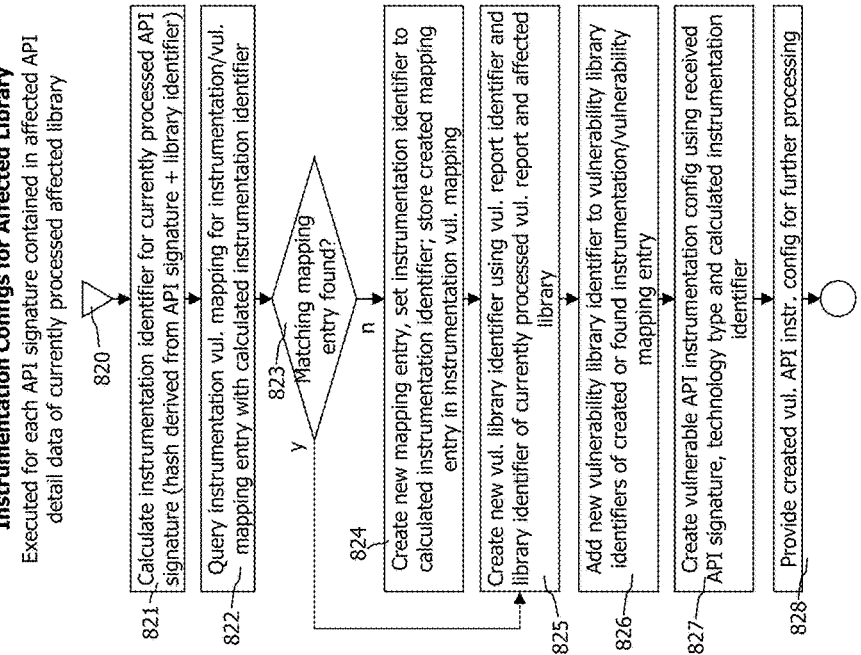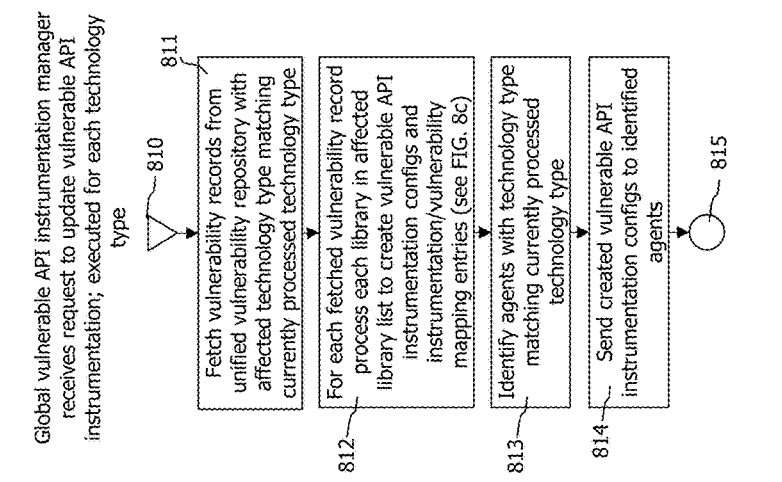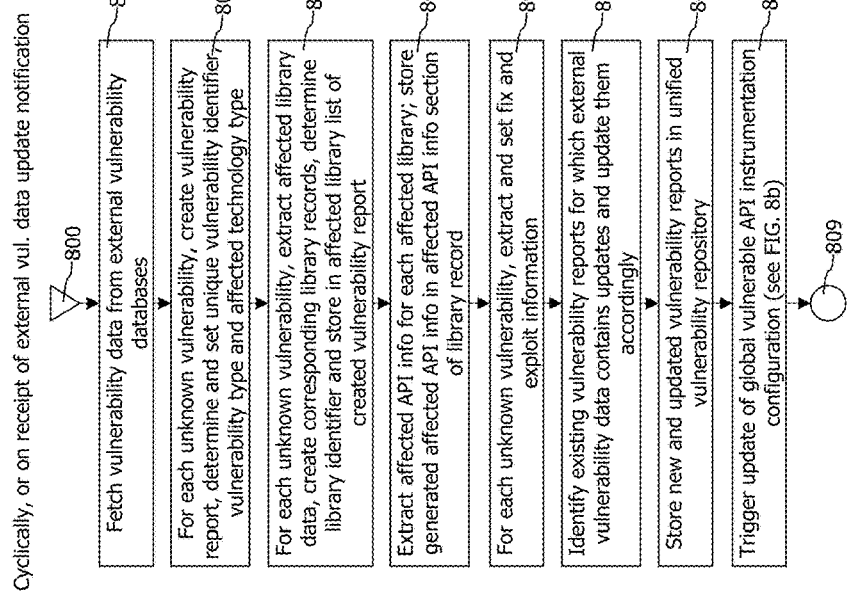

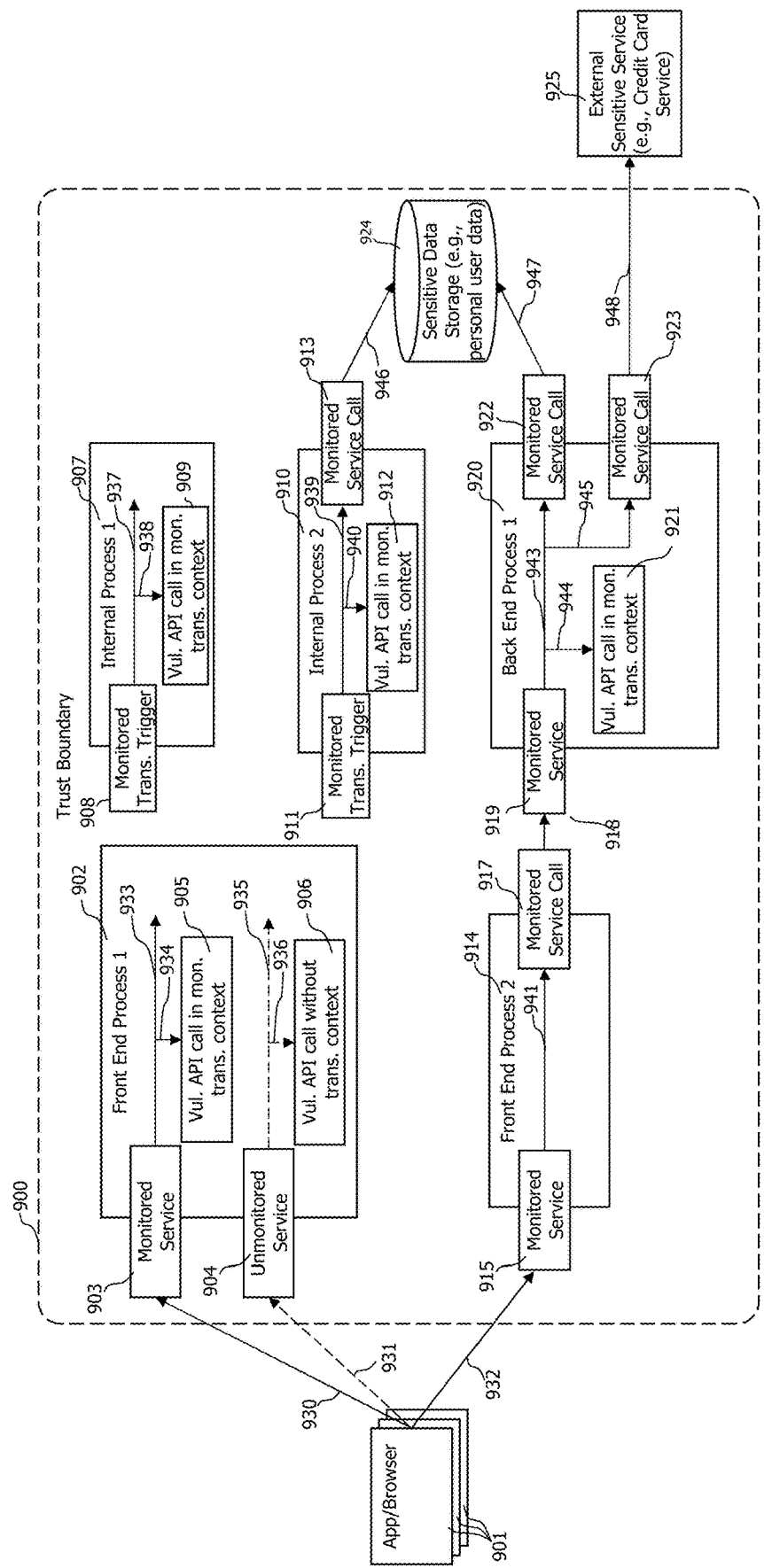

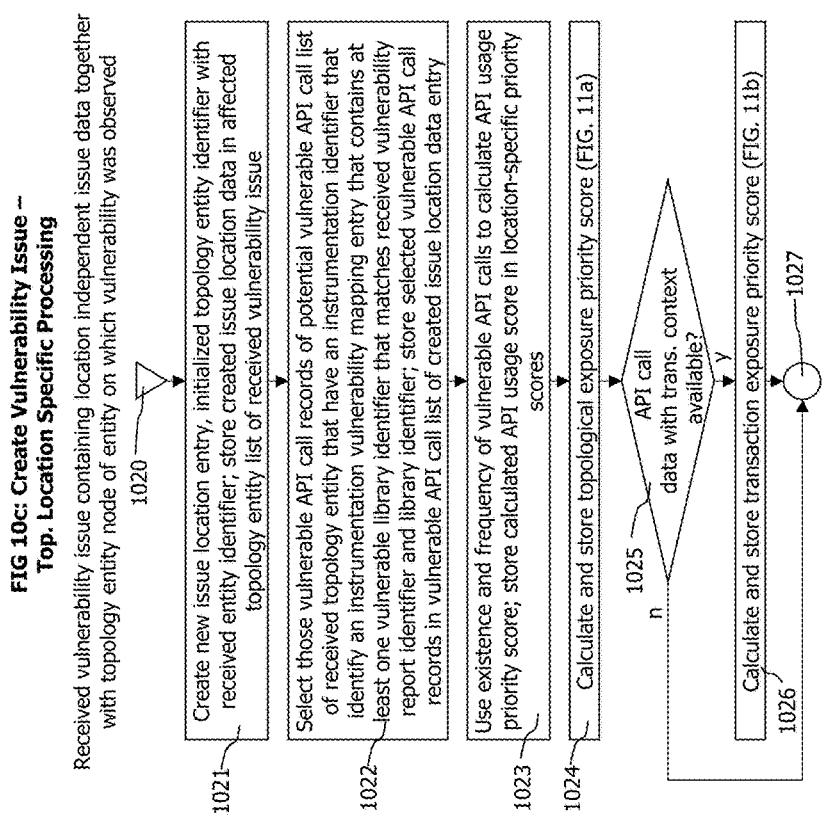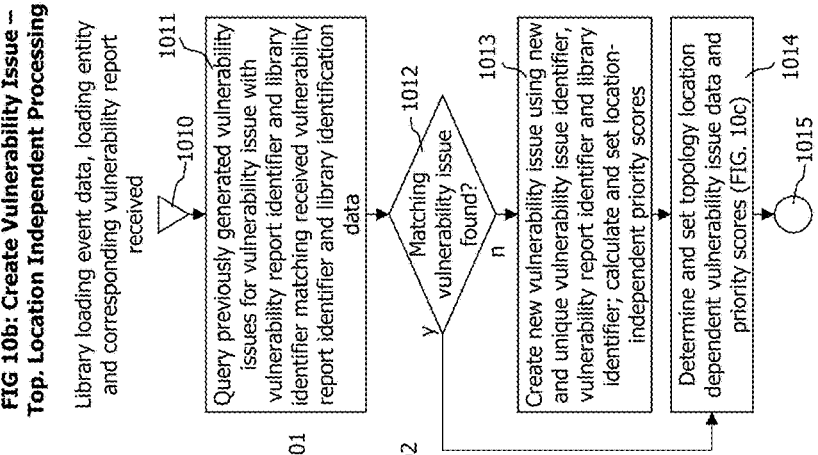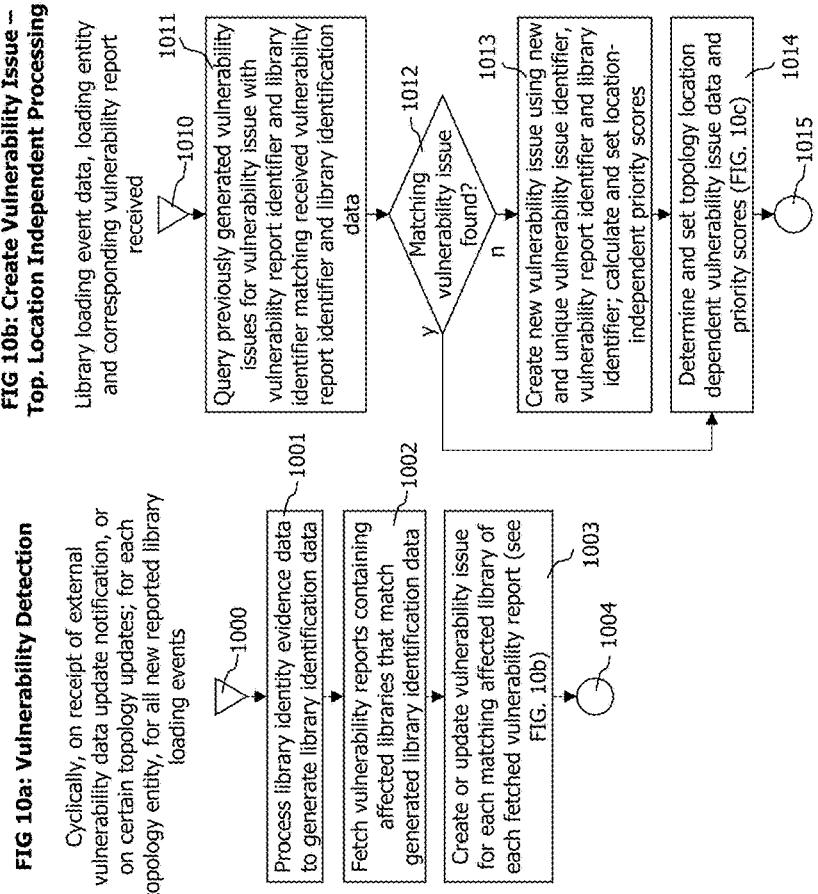

Topology Location Specific Vulnerability Prioritization
FIG 11a: Calculate Topological Exposure Priority Score
Received topology entity on which vulnerability was observed
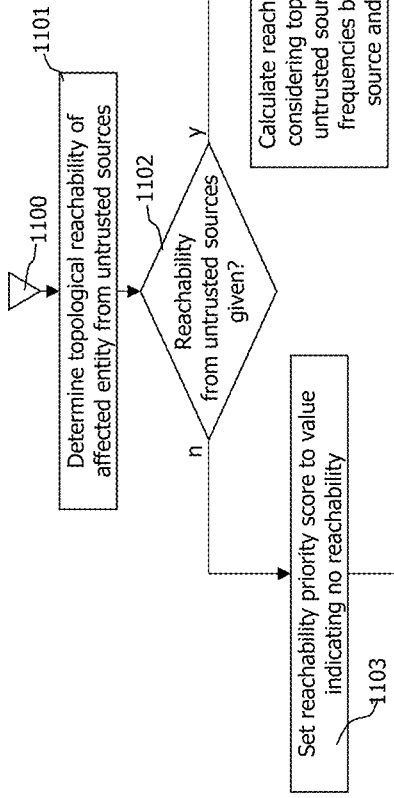
FIG 11b: Calculate Transaction Exposure Priority Score
Topology entity identifier and corresponding API call data with transaction context received
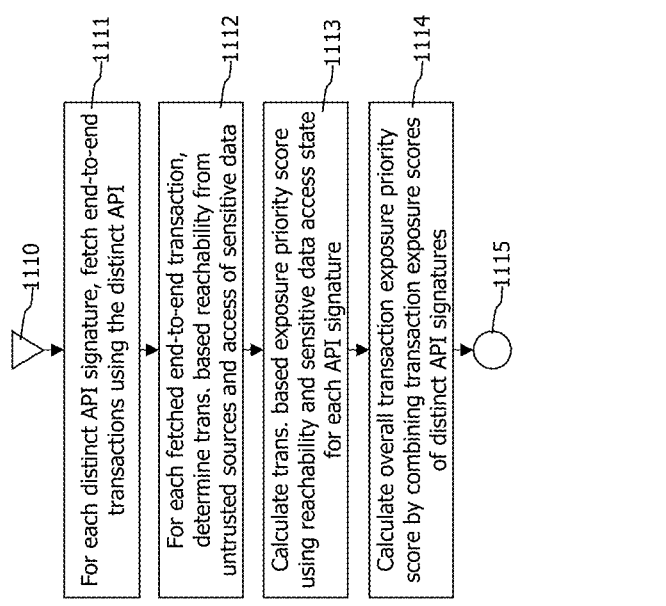

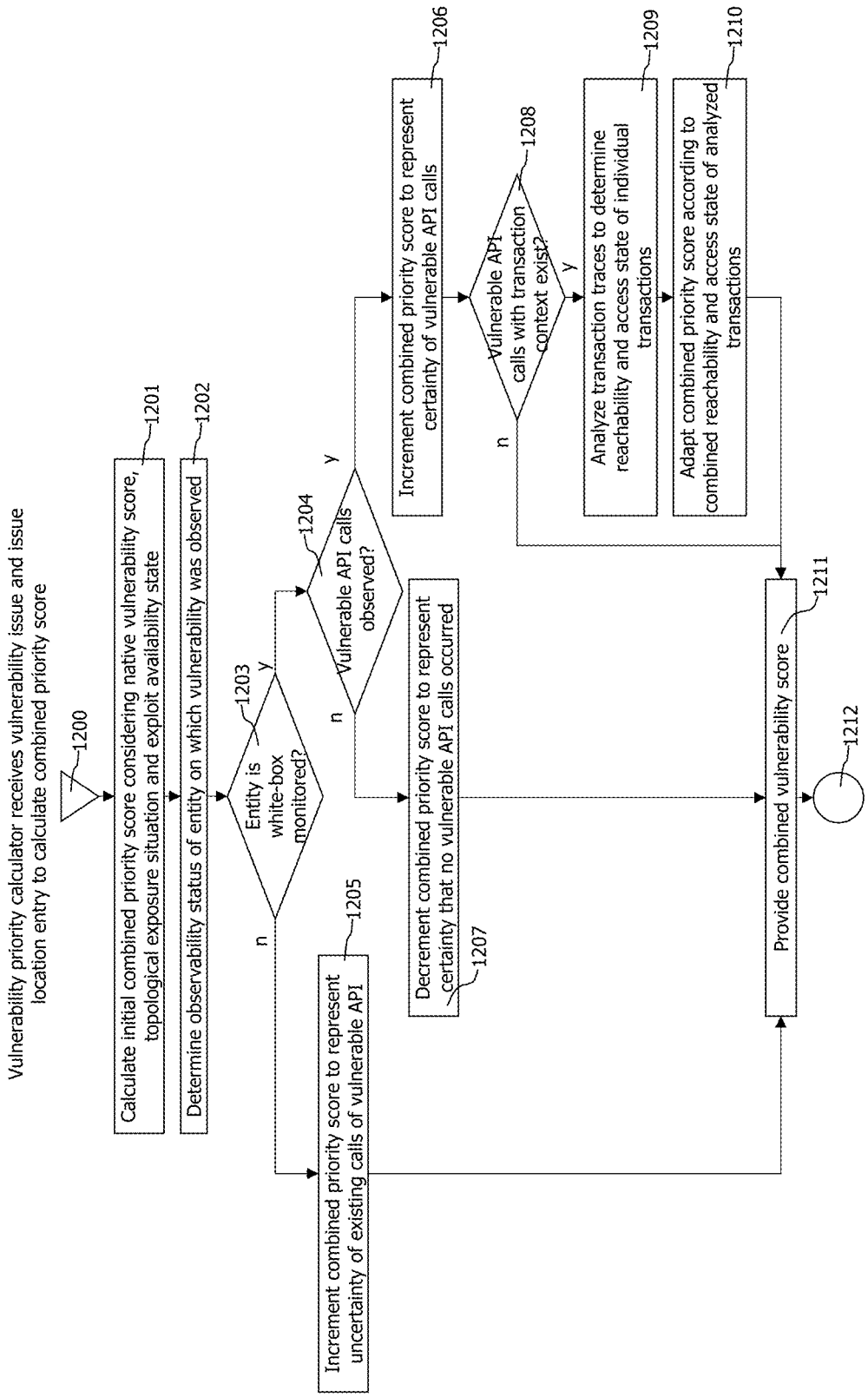
FIG 12: Exemplary Calculation of Combined Priority Score

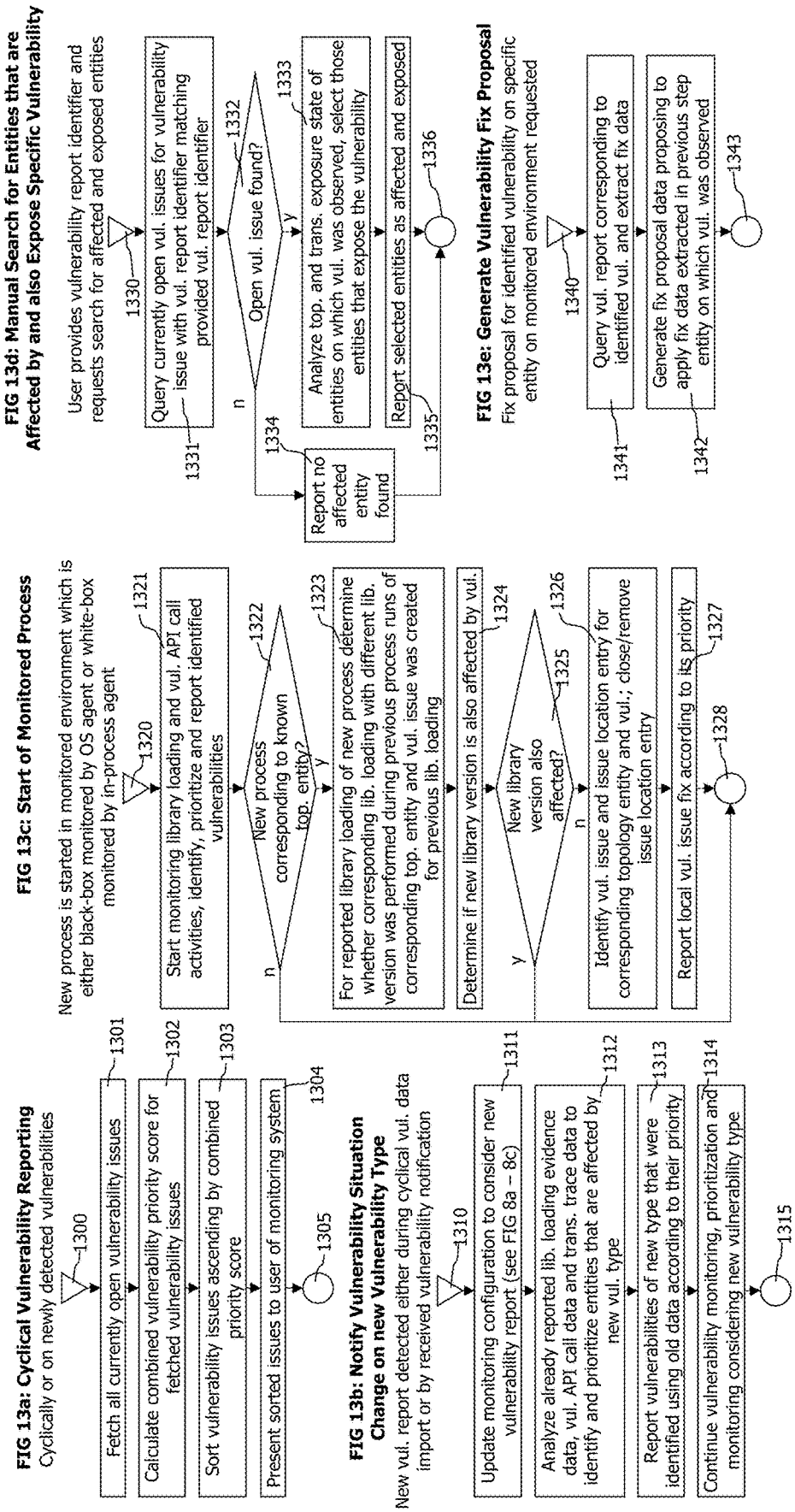

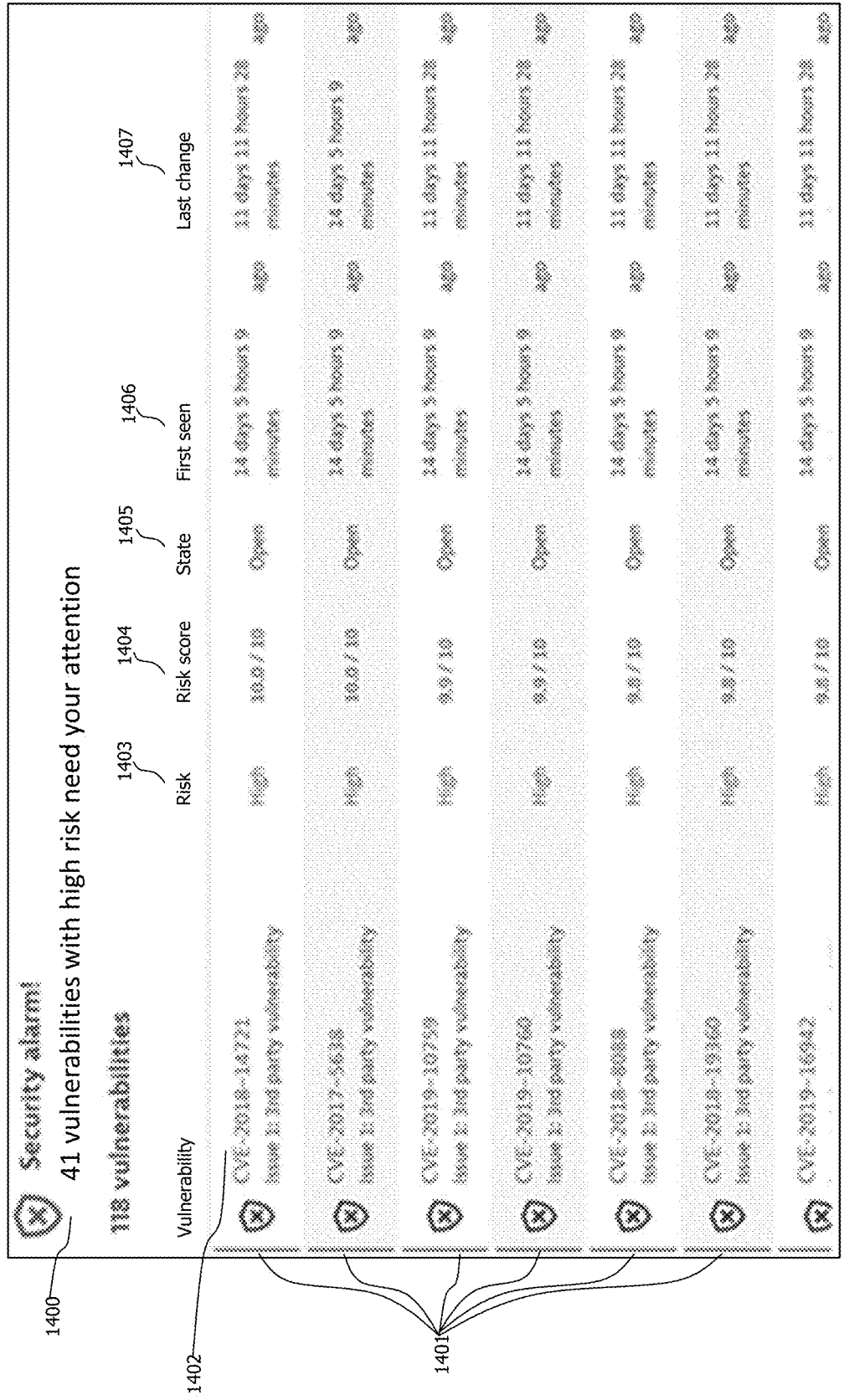
FIG 14: Screenshots of Exemplary User Interface – Prioritized Vulnerability Issues

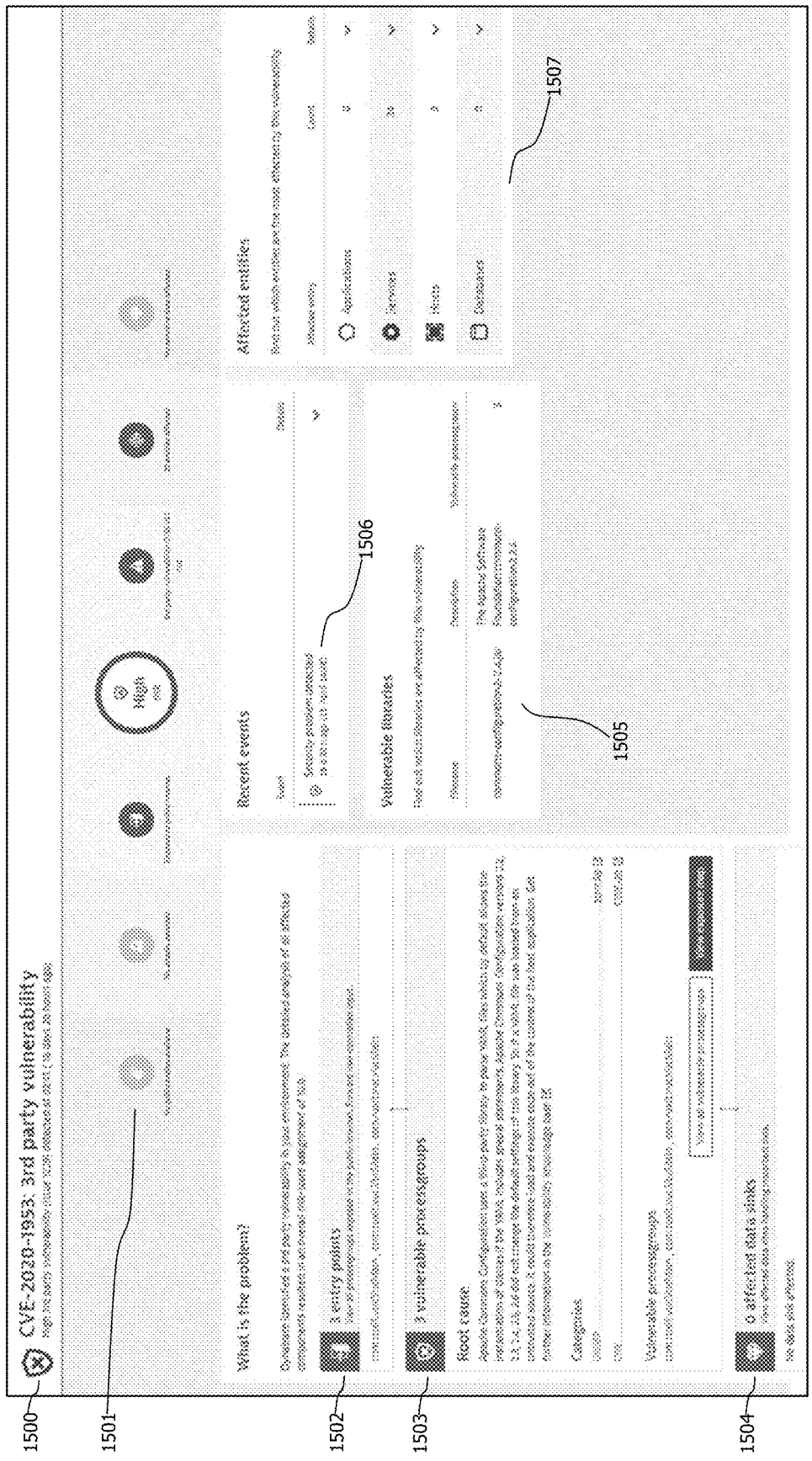
FIG 15: Screenshots of Exemplary User Interface – Visualization of Vulnerability Issue Details

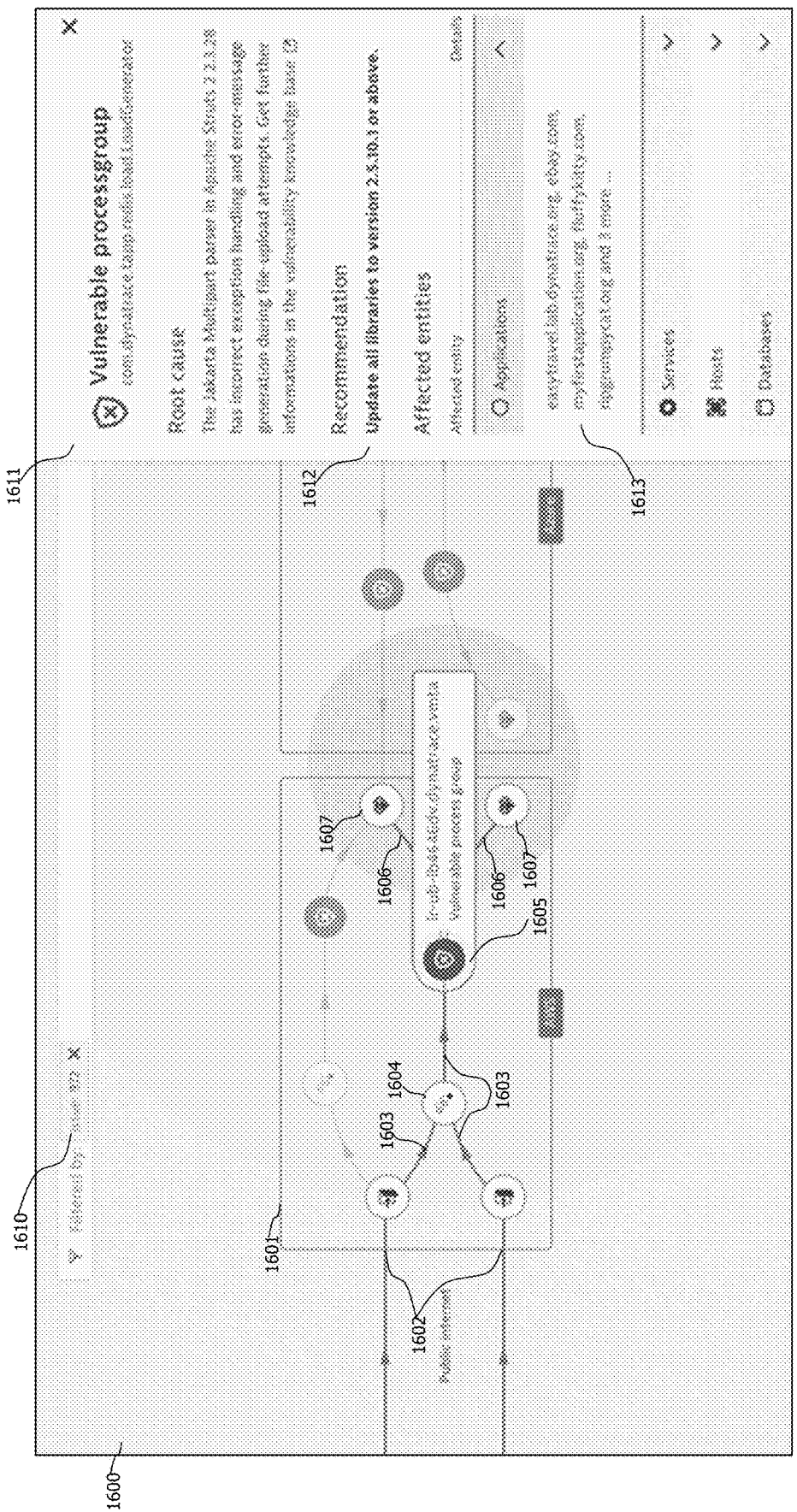
FIG 16: Screenshots of Exemplary User Interface – Vulnerability Visualization in Application Topology

METHOD AND SYSTEM FOR REAL TIME DETECTION AND PRIORITIZATION OF COMPUTING ASSETS AFFECTED BY PUBLICLY KNOWN VULNERABILITIES BASED ON TOPOLOGICAL AND TRANSACTIONAL MONITORING DATA

FIELD

The invention generally relates to the field of automatic detection and prioritization of application security vulnerabilities and more specific to the usage of topological and transactional knowledge accumulated by a monitoring system in combination with publicly known vulnerability information to prioritize identified vulnerabilities of computing assets according to their accessibility and usage of vulnerable components.

BACKGROUND

In current days, software applications store and manage huge amounts of critical and sensitive data, from financial or banking data over health-related data to other personal data. This data makes those applications attractive targets for attackers seeking unauthorized access to this data for criminal and fraudulent use.

Software applications typically rely on publicly available $3^{rd}$ party libraries to perform common tasks, like interacting with data bases, providing web-interfaces or to transfer, store and read data in various forms. Those $3^{rd}$ party libraries are cyclically scanned by vulnerability identification services that provide reports describing identified vulnerabilities. As an example, the MITRE corporation cyclically provides the Common Vulnerabilities and Exposures list (CVE®), which contains detailed reports about identified vulnerabilities in specific versions of $3^{rd}$ party libraries.

Ideally, application providers would desire to identify and eliminate all usages of $3^{rd}$ party libraries that are affected by vulnerabilities, but as the number of $3^{rd}$ party libraries used by a typical application goes into the hundreds and the number of known $3^{rd}$ party library vulnerabilities into the tens of thousands and is growing constantly, this is a task that cannot be accomplished manually.

Tools exist that perform scans of application configuration files and specific locations, like e.g., file systems on which an application was installed to identify and report vulnerable $3^{rd}$ party libraries that exist on the location and/or are referred to in application configurations.

Although those tools fulfill the task of automatically identifying vulnerable $3^{rd}$ party libraries or software components for smaller applications, they are not suitable for large setups.

First, in large environments, even the number of automatically identified vulnerabilities is typically too high to fix all of them. Means to prioritize identified vulnerabilities include the accessibility of application components affected by the vulnerabilities from untrusted, external sources, or the access of sensitive data by those affected components. The rationale behind this proposed prioritization is that only application components that are accessible from untrusted entities can be reached by an attack and that the risk of an attack, and also its probability, rise when a successful attack may also lead to an access of sensitive data.

Modern applications typically follow the service-oriented architecture paradigm, which splits application functionality into loosely coupled, independently scalable services that communicate with each other to provide the application functionality. Although such an architecture supports load elasticity and scalability because individual services may be scaled out separately, it creates a complex and fast changing network of interacting components, which makes it difficult to identify and track communication dependencies to determine outside accessibility or sensitive data access of individual components.

Further, application deployment may be performed in an incremental fashion, in which e.g., libraries used by an older version of the application are not deleted during an update but may reside next to newer library versions that are used by the new application version instead. Vulnerability scanning tools that consider all found vulnerable libraries may in this case report vulnerabilities which affect only the older library versions that are no longer used and thus create false positive reports.

Consequently, there is demand in the field for a vulnerability identification and prioritization system that considers the actual usage of libraries affected by vulnerabilities, and that also analyzes and considers the application specific accessibility context of components that are affected by a known vulnerability.

This section provides background information related to the present disclosure which is not necessarily prior art.

SUMMARY

This section provides a general summary of the disclosure, and is not a comprehensive disclosure of its full scope or all of its features.

This disclosure describes technologies related to the identification of application components of a monitored environment that are loading and using $3^{rd}$ party software components, like libraries that are affected by known vulnerabilities. These technologies further create and use a topological model of the monitored environment that describes the internal communication dependencies of application components, the location of sensitive data that requires protection and trust boundaries of the monitored environment, representing interfaces that are used to communicate with external, untrusted entities.

The term untrusted entity is used herein to for entities that are not controlled by an operator of a monitored environment and that typically operate outside e.g., a data center that is used to operate a monitored application. Examples for untrusted entities include web browsers or mobile applications operated by end-users to interact with a monitored application. Those browsers are typically operated on computing systems owned and controlled by those end-users. Those external web browser typically communicate with an application via externally accessible services. As the web browsers that initiate this communication activities are not controlled by the operator of the monitoring system, it cannot be assured that the received communication requests are originated from trustworthy users. They may also origin from users with fraudulent motivations and therefore contain malicious data that is directed to the exploit of vulnerabilities. Basically, every incoming communication from an unknown origin or from an origin that is not controlled by the operator of the application receiving the communication needs to be considered as received from an untrusted entity. Monitoring data describing loading and usage of $3^{rd}$ party software components and libraries is used to identify those vulnerabilities that are relevant because affected code is actually used by the monitored environment. The application topological context of application components that are affected by relevant vulnerabilities is used as input for a prioritization of relevant vulnerabilities.

Embodiments of the disclosed technology may deploy agents into monitored processes which instrument code that loads libraries for execution into monitored processes with loading sensors. Those loading sensors may detect and report the loading of libraries by monitored processes, extract data describing loaded libraries and send this data to a monitoring server for analysis. Those in-process agents may in addition place sensors to application programmable interfaces (APIs) provided by those libraries to execute provided library specific functionality. Those API sensors may register the actual usage of library functionality and report this usage to a monitoring server. The monitoring server may analyze received library loading and library usage data to determine whether libraries affected by known vulnerabilities were loaded and if library functionality that is affected by known vulnerabilities was actually executed.

In addition to sensors that monitor and report the loading of libraries and the execution of functionality contained in these libraries, agents may in variant embodiments also place sensors that recognize and report receipt, processing and sending of requests by monitored processes. The so created transaction monitoring data may also be sent to a monitoring server for further processing, especially to create end-to-end transaction trace data that describes the execution of distributed transactions that cross thread, process, and host computing system boundaries. In such embodiments, library API call sensors may interact with transaction trace sensors to detect whether library APIs were called during the execution of monitored transaction and in this case create additional correlation data that links reported library API calls with corresponding end-to-end transaction trace data.

Variant embodiments may use load-time or run-time code manipulation mechanisms, like the instrumentation capabilities provided by the Java® platform, to transiently inject sensors into application code.

Other embodiments may deploy agents that in addition monitor structural and communication relationships and dependencies of the components of a monitored environment to create a topological model of the monitored environment. The topology monitoring data may also contain data identifying entities of the monitored environment, like host computing systems or processes that are managed and controlled by the operator of the monitored environment and are therefore trusted. The monitored communication data may contain data that allows to determine whether both or only one of two communicating entities are trusted. This data may be used to identify and model trust boundaries within the topological model. In addition, the topological model may be enriched with data identifying topological entities that store sensitive data.

Those embodiments may use the topology model to determine for topological entities that are affected by relevant vulnerabilities whether they are accessible from untrusted sources or whether they access sensitive data. This topological access status data of vulnerable entities may further, in addition to other monitoring data, be used to prioritize identified relevant vulnerabilities. Variants of those embodiments may in addition use available end-to-end transaction trace data to further refine the access status of vulnerable entities.

Yet other embodiments may in addition deploy operating system (OS) agents that run as separate processes on monitored operating system. Those OS agents may provide additional topology monitoring data for processes that are not instrumented with in-process-agents. In addition, the OS agents may monitor file access and loading activities of such processes and report this data to a monitoring server. This monitoring data may on the monitoring server be analyzed to detect whether the monitored process accessed or loaded files correspond to libraries that are affected by vulnerabilities. In case access of vulnerable libraries is indicated by OS monitoring data, a prioritization of the identified vulnerability, also partially based on the topological access status of the affected process may be performed.

Exemplary embodiments may also cyclically access one or more publicly available vulnerability databases, fetch data describing new detected or updated vulnerabilities, transform fetched vulnerability report data into a unified format and use the unified vulnerability report data to update an internal vulnerability database. This internal vulnerability database may be used to determine whether $3^{rd}$ party software components and libraries loaded by monitored processes are affected by vulnerabilities. The vulnerability database may, next to the global information about libraries that are affected by certain vulnerabilities, also contain detailed data that identifies those portions of the API of the library that are specifically affected by the vulnerability, e.g., because the execution of those API functions leads to the execution of vulnerable code. This data, which identifies vulnerable APIs of affected libraries may be used by a monitoring server to generate instrumentation instructions directed to the instrumentation of vulnerable APIs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1a-1b show a block diagram of a monitoring system consisting of agents operating in monitored components, and a monitoring server that receives monitoring data from the agents, requests public available vulnerability report data and analyzes received monitoring data to identify monitored components affected by vulnerabilities and to prioritize identified vulnerabilities. FIG. 1a shows components of a monitored environment, including agents monitoring activities performed in the monitored environment and FIG. 1b provides an overview of a monitoring server that receives and processes received monitoring data.

FIGS. 2a-2g provide data records that may be used to send monitoring data from agents to the monitoring server and to send configuration data that defines the monitoring activity of agents from monitoring servers to agents.

FIGS. 3a-3c contain flow charts of processes performed during startup of agents and to process received changes of agent configuration data.

FIGS. 4a-4e show flow chart of processes performed by agents to instrument monitored components and to create and send monitoring data.

FIGS. 5a-5e depict data records that may be used by a monitoring server to represent topological models of monitored environments and trace data representing end-to-end transactions executed by the monitored environment.

FIGS. 6a-6f provide flow charts of processes performed by a monitoring server on received monitoring data from agents.

FIGS. 7a-7c show data records that may be used to store reports describing publicly known vulnerabilities, identified vulnerabilities of monitored components and to store mapping data that describes relationships between placed instrumentations and related vulnerability reports.

FIGS. 8a-8c provide flow charts of processes that may be performed by a monitoring server to ingest publicly known vulnerability report data to in turn update agent instrumentation according to new and updated vulnerability report data.

FIG. 9 depicts exemplary topological vulnerability exposure scenarios that lead to different vulnerability prioritizations.

FIGS. 10a-10c show processes performed by the monitoring server to analyze monitoring data for the identification and prioritization of components that are affected by vulnerabilities.

FIGS. 11a-11b provide flow charts of processes that use topology and transaction trace data to determine the exposure status of identified vulnerable components and to calculate component exposure specific vulnerability priority scores.

FIG. 12 contains a flowchart that conceptually describes the calculation of an overall vulnerability priority score out of various partial vulnerability scores that are based on exposure status, usage data of vulnerable APIs and the observability status of the component on which a vulnerability was observed.

FIGS. 13a-13e provide flow charts of exemplary applications of identified and prioritized vulnerability data.

FIG. 14 provides a screenshot of user interface to present a list of prioritized vulnerabilities FIG. 15 contains a screenshot of a user interface to represent an individual identified vulnerability FIG. 16 shows a screenshot of a user interface that visualizes the topological situation of an identified vulnerability.

Corresponding reference numerals indicate corresponding parts throughout the several views of the drawings.

DETAILED DESCRIPTION

Example embodiments will now be described more fully with reference to the accompanying drawings.

A qualified assessment of the security status of an application needs, next to knowledge about vulnerabilities of $3^{rd}$ party libraries, also exact and real-time data about the actual usage of individual $3^{rd}$ party libraries to determine whether known vulnerabilities are relevant in the current situation. In addition, communication data describing the exposure of vulnerable application components to the outside world, and the access to sensitive data performed by those vulnerable application components is required to evaluate the severity of identified vulnerabilities.

Agents may be deployed to computing systems of monitored environments that monitor and report $3^{rd}$ party loading and usage data, monitor and report transaction executions and monitor and report structural and communication related topology data of the monitored environment. A monitoring server may receive this data and create a topology model of the monitored environment, end-to-end transaction trace data of transactions executed by the monitored environment. It is noteworthy that the monitoring server may also be implemented in form of a cluster of physical monitoring servers that together form one logical monitoring server to increase performance and capacity of the monitoring system.

The topology model may be augmented with $3^{rd}$ party loading and usage monitoring data. The monitoring server may in addition fetch data describing publicly known vulnerabilities of $3^{rd}$ party libraries and use the received topology, library loading and usage and transaction trace data to identify and prioritize those of the publicly known vulnerabilities that are relevant for the monitored environment. A publicly known vulnerability of a $3^{rd}$ party library may be considered relevant if received monitoring data both indicates that the specific library was loaded, and that vulnerable code contained in the library was executed. Identified relevant vulnerabilities may then be prioritized according to the external exposure and sensitive data access status of the application component on which the vulnerability was detected.

Coming now to FIGS. 1a and 1b which provide a simplified block diagram of a monitoring system consisting of a monitoring server (FIG. 1b) and one monitored computing system on which one process with an injected in-process-agent and an OS agent are running (FIG. 1a). Real-world installations typically contain a multitude of host virtualized or bare-metal host computing systems and those host computing systems run multitudes of processes.

A monitored computing system 100 residing in a monitored environment consisting in a multitude of monitored computing systems (not shown), executes a monitored application process 101. An in-process-agent 110 is injected into the monitored application process. The monitored computing system may in addition execute other processes and in-process-agents may be injected into some of those other processes. For brevity, those other processes are not shown in FIG. 1.

An OS agent process 114 may also be executed on the monitored computing system. The OS agent process may monitor the start of processes, like the monitored application process 101, on the monitored computing system, analyze the starting processes, and depending on the type of the starting process, inject a type-specific in-process-agent into the staring process. The OS agent 114 may in addition use interfaces provided by the operating system to monitor the computing system 100 and processes, like the monitored application process 101. The OS agent may generate resource usage and performance monitoring data for individual processes and the overall computing system, topology data describing and identifying the monitored computing system and processes running on it and describing low-level communication activities of individual processes. In addition, the OS agent may monitor file access activities of processes, filter file access activities that indicate the execution of code containing in the accessed files, and in case files are accessed for the execution of contained code, extract evidence data from the accessed files that may be used to reconstruct the identity of the accessed files. The OS agent sends topology and measurement data in form of OS-level topology data 131 and file access evidence data in form of out-of-process library evidence data 134 to a remote monitoring server 140. In variant embodiments, the OS agent may only monitor and report file access activities of processes that are not monitored by an injected in-process-agent.

The monitored application process 101 executes a portion of the functionality of a distributed application and interacts with other application processes or users of the application in form of sent and received requests and responses 107.

Business or application logic 102 executed by the monitored application process may receive incoming requests, perform local processing of the request and send requests to other application processes to delegate portions of the request processing to them and, after processing is completed, return a corresponding response to the sender of the request.

To perform local processing and to interact with other processes, the application logic may use various $3^{rd}$ party libraries. Some of those $3^{rd}$ party libraries may be loaded on startup of the process, others may only be loaded on demand, when they are required for a specific task, e.g., during request processing.

The application logic 102 may load 105 $3^{rd}$ party libraries 104 that are located outside the monitored application process, e.g., on a file system managed by the surrounding operating system, into the memory of the process. Already loaded $3^{rd}$ party libraries 103 may be accessed 106 by the application logic via APIs provided by the $3^{rd}$ party libraries.

An in-process-agent 110 may be injected into the monitored application process. The in-process-agent may identify specific portions of code that is loaded and executed by the monitored application process and may then manipulate the identified code portions by inserting sensor code into those code portions in a way that the sensor code is executed whenever the identified code sections are executed. The sensor code generates monitoring data that describes the execution of the code into which it is injected and sends the generated monitoring data to the in-process-agent.

The in-process-agent instruments various types of sensors into code executed by the process, depending on the functionality performed by the code targeted by the sensor. Transaction sensors 111 are instrumented into code of the application logic that monitors receipt and sending of requests, processing of requests or transfer of processing between threads. In cooperation, transaction sensors 111 monitor 115 transaction processing and communication activity and send this monitoring data in form of transaction trace data 116 to the in-process-agent. The transaction trace data may then be used to generate end-to-end transaction trace data that describes individual distributed transactions over host computing system, process, and thread boundaries.

Loading sensors 113 may be placed to code that loads external packages of executable code (e.g., in form of $3^{rd}$ party libraries) into the process for execution. Loading sensors may analyze 120 the loaded executable code and meta-data bundled with the executable code to create identity evidence data 121 that may be used to determine the identity of loaded executable packaged. This evidence data may contain but is not limited to data identifying vendor, name, and version of the loaded package. Generated evidence data will be sent to the in-process-agent, which forwards 133 it to the monitoring server 140 in form of in-process library evidence data.

Potentially vulnerable API sensors 112 are placed to API methods of loaded $3^{rd}$ party software components for which vulnerabilities exist in at least one version of the $3^{rd}$ party component. Potentially vulnerable API sensors 112 are placed 119 by the in-process-agent 110 according to potentially vulnerable API sensor instrumentation instructions 135, which are derived from publicly known vulnerabilities. An exemplary potentially vulnerable API sensor instrumentation instruction may contain identification data for a specific API function, like a class name, and a method signature. Whenever the agent detects that a class is loaded that matches class name of a potentially vulnerable API sensor instrumentation instruction and that class further contains a method that matches the method signature of the potentially vulnerable API sensor instrumentation instruction, a potentially vulnerable API sensor 112 is placed in the method, which reports 118 calls to this method. As this instrumented API method may exist in multiple versions of the $3^{rd}$ party software components and only a subset of this versions may execute vulnerable code, evidence of the execution of this API alone, as reported by a potentially vulnerable API sensor 112 is not sufficient to determine whether vulnerable code was executed. A combination of the monitoring data generated by vulnerable API sensors 112 and loading sensors 113 is required to determine if the called API function is originated from a version of the $3^{rd}$ party library in which the called API function is affected by a vulnerability. Data describing observed API calls is sent to the in-process-agent 110 which forwards it to the monitoring server 140 in form of vulnerable API call data 132.

A transaction trace and topology data processor component 141 of a monitoring server 140 receives transaction trace and process-level topology data and OS-level topology data from at least one in-process-agent and at least one OS agent.

Transaction trace and process-level topology data 130 contains data describing portions of transaction executions performed by processes, and topology data identifying and describing individual processes. OS-level topology data 131 identifies and describes a computing system, the processes executing on the computing system and communication activities performed by these processes.

The transaction trace and topology data processor uses the received transaction trace data to incrementally create end-to-end transaction trace records describing individual transaction executions. Created end-to-end transaction trace records are stored in a transaction trace repository 151.

Received process level and OS level topology data is used to incrementally create a topology model 154 of the monitored environment in a topology model repository 153. The topology model may describe components of the monitored environment, like host computing systems, processes executed on those host computing systems and observed communication paths between those components. Transaction trace data may be analyzed to identify entry points of transactions into processes. Those entry points represent services provided by processes and the sequence of service calls within transactions represents call dependencies of those services. The topology model may be enriched 175 with identified service and service call dependency data. A trust boundary 155 of the monitored environment may also be identified and described in the topology model. The trust boundary may e.g., be defined as those services which receive requests from external sources that are not controlled by the operator of the monitored environment. For web-based applications, such a trust boundary may e.g., be defined by those services provided by processes of the monitored application that interact with web browser of end-users of the monitored application which operate on external computing systems.

In some embodiments, users of the monitoring system may define and enter into the monitoring system one or more ranges of network addresses (IP-address ranges), that define trust boundaries in form of trusted network areas. All communication within those network ranges may be considered trustable and all communication originating from a source address or directed to a destination address that is not contained in the trusted address ranges may be considered not trustable. In other embodiments, all communication from or to an entity that is not instrumented with an in-process agent may be considered not trustable. Various other methods may be used to define trust boundaries of a monitored environment without departing from the scope of this disclosure.

Vulnerable API call data is received by a vulnerable API call data processor 142, which fetches topology entities representing the components of the monitored environment on which the reported vulnerable API call was observed and updates 161 those topology entities with data describing the reported API calls.

If the reported vulnerable API calls were initiated by monitored transactions, the corresponding end-to-end transaction traces 152 are fetched and updated 162 with the corresponding vulnerable API call data.

Library evidence data sent either from in-process-agents or OS agents is received by a library evidence data collector 143, which fetches the topology entities representing the environment components on which the library loading event was observed and enriches 164 them with corresponding received library evidence data.

A vulnerability report importer 149 may cyclically import 167 reports describing publicly known vulnerabilities from various public vulnerability databases 150. Typically, those public vulnerability databases provide interfaces for an automated access of vulnerability report data.

The vulnerability report importer processes fetched external vulnerability reports and converts them into an internal vulnerability report format. The converted vulnerability reports are stored 166 in a unified vulnerability repository. Different vulnerability databases 150 may use different formats to describe vulnerabilities and provide different type and quality of data describing vulnerabilities. The vulnerability report importer aligns these different formats and data qualities and generates vulnerability reports 148 in a unified format.

A global vulnerability API instrumentation manager 144 recognizes updates to the unified vulnerability repository, like the adding of new vulnerability reports or modifications of existing vulnerability reports. An analysis of API and tech type data of added/changed vulnerabilities 165 is performed on recognized changes. Result of this analysis are e.g., new detected vulnerable APIs. Vulnerable API instrumentation instructions 135 are created for identified vulnerable APIs and sent to in-process agents 110. In-process agents use received vulnerable API instrumentation instructions to update vulnerable API instrumentation consisting in multiple potentially vulnerable API sensors 112. The instrumentation update may either be performed during application runtime, directly after receipt of the instrumentation instruction, or on the next application restart if runtime instrumentation is not supported on a process receiving an instrumentation update.

The global vulnerability API instrumentation manager 144 may also maintain an instrumentation vulnerability mapping repository 145, which maps identifiers of placed vulnerable API sensors to corresponding vulnerability reports. Instrumentation identifiers may be added to vulnerable API instrumentation instructions and vulnerable API sensors 112 may generate vulnerable API call data 132 that contains these identifiers.

This instrumentation identifier may also be added to instrumentation vulnerability mapping entries 146. Instrumentation vulnerability mapping entries may also contain identifiers of vulnerability reports that indicate the API identified by the instrumentation identifier stored in a instrumentation vulnerability mapping entry as vulnerable.

A vulnerability identifier 156 may, either cyclically, or on changes of the unified vulnerability repository or the topology model, perform analyses to identify elements of the monitored environment that are affected by known vulnerabilities.

The vulnerability identifier 156 may fetch 169 vulnerability reports from the unified vulnerability repository 147 and may also fetch 168 observed library loading and API call data from the topology model. The fetched data is analyzed to first determine which topology entities loaded libraries that are affected by vulnerabilities, and afterwards to determine which of those topology entities also call vulnerable APIs of the loaded vulnerable libraries.

The result of the performed analyses is a set of vulnerability issues 157, which identifies elements of the observed environment that are loading vulnerable libraries. Recognized usages of vulnerable APIs are also contained in vulnerability issues.

Created vulnerability issues 157 are forwarded 171 to a vulnerability priority calculator 158. The vulnerability priority calculator analyzes the topological situation of application components that are affected by vulnerabilities, transaction trace data indicating vulnerable API usage and additional vulnerability report data to prioritize received vulnerability issues.

The vulnerability priority calculator 158 may fetch topology exposure data 172 for entities affected by vulnerabilities, which e.g., describes how affected entities are reachable form untrusted, outside entities and whether affected entities access sensitive assets.

Transaction trace data for vulnerable API calls reported in vulnerability issues 157 may also be fetched 173 by the vulnerability priority calculator for its analyses, and the vulnerability priority calculator may also fetch detail data from vulnerability reports referred by vulnerability issues, like a severity grade of the vulnerability or indicators for the existence of an exploit or a fix of the vulnerability.

The fetched data may be used by the vulnerability priority calculator 158 to calculate priority scores for received vulnerability issues. The prioritized vulnerability issues 159 may be provided 174 by the vulnerability priority calculator for visualization, storage and further automated or manual analyses. Both vulnerability issues 157 and prioritized vulnerability issues 159 may use the same data records, as e.g., described in FIG. 7c. The only difference between both types of vulnerability issues is that for prioritized vulnerability issues 159 the corresponding priority score sections 734 and 743 are already set by the vulnerability priority calculator 158.

Coming now to FIGS. 2a-2g which show various data records that may be used by a monitoring system to transfer data between agents and monitoring servers.

A vulnerable API instrumentation configuration record 200, which may be used to transfer vulnerable API instrumentation instructions from monitoring servers to agents, is shown in FIG. 2a. A vulnerable API instrumentation configuration record 200 may contain but is not limited to a technology type indicator 201, which specifies the technology or application platform for which the instrumentation is intended, an instrumentation identifier 202, which identifies the instrumentation configuration, and an API signature pattern 203, which identifies the portions of an API that are targeted by the vulnerable API instrumentation configuration.

Examples for technology indicated by a technology type include Java™, .NET™, Go, node.js or PHP application platforms. Sensors that are placed according to a given vulnerable API instrumentation configuration record may include the instrumentation identifier 202 in created monitoring data.

An API signature pattern 203 may contain but is not limited to a class name 204 and a method name pattern 205, which may be used to identify classes and further methods contained in those classes, parameter and return type pattern, which may be used to select methods based on their input parameters and return parameters, and an optional file name 207 which may be used, e.g. for instrumentation configs targeted to script-based technologies like e.g. PHP, to define the name of a file in which a search for matching classes and methods should be performed. Class and method name patterns may specify full names, name prefixes or postfixes or substrings that should be contained in matching class and method names. Parameter and return type patterns may specify lists of types and corresponding match criteria. Example match criteria for parameter and return type patterns include a full match criterion, which selects only methods with interfaces that exactly match specified parameter pattern or a contains criterion, which selects methods with interfaces that at least contain the parameter types specified in the pattern.

A vulnerable API call record 210, as shown in FIG. 2b, may be used to transfer monitoring data created by a potentially vulnerable API sensor 112 to a monitoring server 140. A vulnerable API call record may contain but is not limited to an instrumentation identifier 211, which connects the monitoring data contained in the call record with the instrumentation configuration that caused the placement of the sensor that created the monitoring record (and in turn with the corresponding vulnerability report that caused the creation of the instrumentation configuration), an API signature 212, which describes the actual executed potentially vulnerable code, optional call context data 217, containing captured call parameter and return values 218 of the recorded API call and call stack data 219 describing the call-nesting context of method or function calls that led to the call of the potentially vulnerable API and optional transaction context data 220 which contains data to identify a transaction trace, e.g. in form of a local trace fragment identifier 221, in case the recorded API call was performed during the execution of a monitored transaction. An API signature 212 may contain a concrete class name 213, method name 214, parameter and return type list 215 and an optional a file name 216 which together unambiguously identify the called method or function. In addition, a vulnerable API call record may contain a calling entity identifier 222, which identifies the entity, like e.g., a process that performed the observed API call.

FIG. 2c shows a library identity evidence data extraction configuration record 230, which may be used to define how library identity evidence data is extracted from a loaded library. Library identity evidence data may be extracted from executable code of the library and accompanying meta-data either contained in files also containing executable library code or in additional library files. Example evidence data contains but is not limited to names of classes or methods contained in the executable code of the library, name of the file containing the executable code, data contained in package manager files accompanying loaded libraries, like "POM.xml" files for the Maven package management system (often used for Oracle Java® environments), "package.json" files for the npm package manager (for node.js projects) or ".nupkg" files for the NuGet package manager (for .NET based applications). Those package manager files are typically text files noted in structured or semi-structured format that support fast and easy automated analysis and extraction of library identification data.

A library identity evidence data extraction config record may contain but is not limited to a technology type 231 which specifies the technology, like e.g. Java, .NET, JavaScript etc. to which the record is directed, an evidence type indicator 232, specifying the type of the extracted evidence data, like e.g. class/package names extracted from executable code, library file name or library metadata containing name, vendor and version of the library from package manager files, together with a type of package manager file (e.g. "POM.xml", "package.json" or ".nupkg" files for Maven, npm or NuGet package managing systems), and an extraction method 233, specifying how the metadata is to be extracted. The extraction method 233 may depend on the evidence type 232. For evidence types that extract evidence data from executable code, the extraction method may e.g., contain data identifying distinguishing package and class names, which may be used to determine whether executable library code contains those packages or classes as evidence for the library identity. For package manager data based evidence types, the extraction method may specify various identifiers for XML tags or key-value keys that identify library names, vendors, and versions. It should be noted that evidence extracted from executable library code and library file names may also include library names, library vendor names and library version data.

In some embodiments library identity evidence data extraction config records 230 may be managed by users of the monitoring system, e.g., via a GUI provided by the monitoring server 140. Those records may then be sent to agents 110/114, which use them during the execution of loading sensors 113 to extract library identity evidence data. In other embodiments the extraction of library evidence data may be hard coded in the loading sensors 113.

Coming now to FIG. 2d, which describes a library loading evidence data record 240. A library loading evidence data record 240 contains data describing a library loading event and identity evidence data for the loaded library. A library loading evidence data record 240 may contain but is not limited to a loading entity identifier 241, which identifies the entity, like e.g. a process that performed the observed library loading, a loading event identifier 242 which uniquely identifies the monitored loading event, a loading event timestamp 243, a library identity evidence fingerprint 244, which may be calculated from a set library identity evidence data and uniquely identify this evidence data set, and a set of library identity evidence data 245. A library identity evidence data set 245 may contain multiple library identity evidence entries 246 and a library identity evidence entry 246 may contain but is not limited to an evidence type 247 that specifies the source of the described evidence (e.g. executable code, file name or package manager data) and its sematic (e.g. package name, file name, library name/vendor/version extracted from package manager data), and an evidence value 248 that contains the extracted evidence (e.g. extracted library/library vendor name, library version, class/package name, library file name).

Transaction trace records 250 as shown in FIG. 2e, may be used to transfer transaction trace data, describing a portion of a monitored transaction that was executed on a specific process, from in-process agents 110 injected into processes, to monitoring servers 140. A transaction trace record 250 may contain but is not limited to a local trace fragment identifier 251 which identifies a portion of a transaction executed on a specific process, the process on which the transaction portion was executed and the host on which the process was running, incoming call trace data 252, which specifies the request that was received by the process executing the transaction portion that caused the execution of the transaction portion and local call processing trace data 254 which describes the execution of the transaction portion in detail, e.g. in form of function or method executions that were performed by the process to execute the transaction portion, together with corresponding call context data (values of call parameters and return values) and functionality and performance measurement data. Incoming call trace data may, in case the process that generated and sent the incoming request also has an agent injected, contain a parent trace fragment identifier, which identifies the transaction trace record 250 that describes the execution of the transaction portion that caused the sending of the request that initiated the processing of the transaction portion that is described by the current transaction trace record. Incoming call trace data may also include sender network data 253, which identifies the network endpoint from which the request that initiated the processing described by the transaction trace record 250 was received. Sender network data may e.g., consist of a network address and a port. Local call processing trace data 254 may, in addition to trace data describing processing performed by the local process, also contain outgoing call trace data 255 describing performed requests that sent messages to other processes during local transaction processing. Outgoing call trace data 255 may contain receiver network data 256 that identifies the destination of recorded outgoing calls, e.g., in form of a network address and a port.

Coming now to FIG. 2f which provides a topology entity record 260, which may be used to transfer data describing a monitored entity (e.g., process, container, host computing system, virtualization component like hypervisor) from an agent 110/114 to a monitoring server 140. The data contained in topology entity records 260 may be used to create and update a topology model 154 of a monitored environment.

A topology entity record 260 may contain but is not limited to an entity identifier 261, identifying the monitored entity that is described by the topology entity record, an optional parent entity identifier 262, which identifies the monitored entity that contains the current entity, an entity type 263 specifying the type (e.g. process, container, host computing system, virtualization component etc.) of the described monitored entity, entity description data 264 which contains descriptive properties of the monitored entity, like for host computing systems data describing the hardware configuration of the host and the operating system running on it, for processes data describing resources assigned to the process, the command line used to start it and application execution platform executed by the process (e.g. Java VM, .NET CLR, PHP or JavaScript interpreter, like the node.js JavaScript runtime) and for containers data describing the container image used to start the container. A topology entity record may in addition contain network data 265, e.g., consisting of one or more network addresses for hosts or containers and, for processes, also numbers of used communication ports.

Topology communication records 270, as shown in FIG. 2g may be used to transfer data describing observed communication activities between entities of a monitored environment from agents 110/114 to a monitoring server 140.

A topology communication record 270 may contain but is not limited to endpoint data 271 which identifies the two entities that are involved in the monitored communication activity. Endpoint data 271 may contain but is not limited to client endpoint data 273 and server endpoint 274 data containing data describing the network endpoint from which the communication was initiated (client endpoint) and to which the communication was directed (server endpoint). Both client endpoint and server endpoint may contain entity identifier/network address data 273/275, which may contain data identifying the monitored entity that initiated or served the observed communication, and data describing the network address and, if applicable, also the network port used for the communication.

Coming now to FIGS. 3a-3c which provide flowcharts of processes that are performed during the startup of agents 110/114 and for the processing of configuration data changes received by running agents.

The startup of an in-process agent, which takes place when a monitored process is started and an in-process agent is injected in the monitored process and started before any application specific code is executed by the process, is shown in FIG. 3a.

The process starts with step 300, when an in-process agent is started due to the start of the process into which it is injected. In following step 301 the in-process agent determines the type of technology or application platform that the process into which it is injected is executing. Exemplary technology types or application platforms include Java, .NET, PHP, node.js or Go platforms. Those platforms provide abstractions from underlying operating systems and provide interfaces to interact with the operating system or to communicate with other processes. Step 301 may analyze the command line of the starting process, loaded basic libraries or specific interactions of the process with the operating system to determine the technology type.

After the technology type was determined by step 301, step 302 is executed which fetches instrumentation configuration data for the identified technology type. The configuration data may be fetched from a monitoring server, intermediate nodes that relays communication between agents and monitored nodes or from a storage location situated at the host computing system executing the starting process. The fetched configuration data may include configuration data for transaction tracing related instrumentation, for the instrumentation of potentially vulnerable APIs and for the extraction of library identity evidence data. The fetched configuration data may include names of classes and methods, method signature descriptions that identify methods that are relevant for instrumentation, names of package manager configuration files and data to identify portions of package manager configuration files that contain library identity data. Those relevant methods, package manager files and their structure vary between technology types. Therefore, it is important to fetch configuration data that matches the identified technology type.

Step 303 is executed after step 302, which starts monitoring the loading of executable code by the starting process. Typically, application platforms provide call backs that are executed when code is loaded for execution and the in-process agent may be registered for such call backs to get notified when code for execution is loaded.

The in-process agent may, on detecting the loading of code for execution, analyze the loaded code to determine whether it should be instrumented according to the currently active instrumentation configuration. In case the configuration indicates that instrumentation is required, the in-process agent places appropriate sensors 111 and 112 according to the instrumentation configuration. Placed transaction tracing sensors 111 may detect and report method calls performed during the execution of monitored transactions and send corresponding transaction trace records 250 and placed vulnerable API sensors may detect calls of vulnerable API methods and send corresponding vulnerable API call records 210 to a monitoring server 140.

Step 303 may also start cyclic topology reporting, which may include cyclic creation and sending of topology entity records 260 and topology communication records 270 that identify and describe the process, the host computing system executing the process and communication activities performed by the process.

Subsequent step 304 then places loading sensors 113 to application platform code that loads libraries for execution. The load sensor recognizes the loading of libraries and extracts library identity evidence data and data describing the library loading event to create and send library loading evidence data records 240. FIG. 4b provides a detailed description of the activities performed by a loading sensor.

Typically, a library consists of one or more files that contain executable code in form of packages and classes and metadata describing the library. In some environments, loading a library does not cause the process to immediately load the whole executable code contained in the library. In such environments, the event of loading a library only makes the code fragments (classes, packages) contained in the library available to get loaded on demand by the process that loaded the library.

Therefore, load sensors placed to library loading code recognize when sets of executable code fragments are made available to the loading process for later execution and sensors placed in step 303 are placed when such code is actually loaded for execution.

The process then ends with step 305.

FIG. 3b describes the startup of an OS agent. An OS agent may be implemented as a stand-alone process that is automatically started when the operating system on which the OS agent is installed is starting.

The process is starting with step 310, when the OS agent is started e.g., due to the start of the host computing system/operating system on which it is installed.

Subsequent step 311 starts monitoring the start of process executions on the operating system by the OS agent. The OS agent may send topology data, e.g., in form of topology entity records 260, describing the currently executed processes and the host computing system/operating system on which those processes are executed to a monitoring server.

The OS agent may further monitor communication activities performed by monitored processes. For detected communication activities, the OS agent may determine the network endpoints used for the communication activities and report them in form of topology communication records 270.

Following step 312 may determine for each started process whether an in-process agent is deployed to the process. Processes may not contain an in-process agent for various reasons. Either a user of the monitoring system has configured the system to not inject in-process agents into specific processes, or no in-process agent matching the technology of a process is available.

Subsequent step 313 is executed by the OS agent for all processes that do not contain an in-process agent. Step 313 monitors file access activities of those processes that indicate the loading of library code for execution. Examples for such a file access activity include the access of ".so" (shared object), ".dll" (dynamically loadable library) or ".jar" (Java archive) files. On detection of a file access that indicates the loading of a library, the OS agent may analyze the accessed file to extract library identity evidence data and create and send a corresponding library identity evidence data record 230 to the monitoring server. FIG. 4b describes this in more detail. The process then ends with step 314.

The processing of vulnerability monitoring configuration updates by already running agents 110/114 is shown in FIG. 3c. Vulnerability monitoring configuration may contain but is not limited to one or more library identity evidence data configs 240 and one or more vulnerable API instrumentation configs 200.

The process is started with step 320, when new vulnerability monitoring config data is received by an agent 110/114. Subsequent step 321 compares library identity evidence data extraction config data received with the config data update with the library identity evidence data extraction config data currently used by the agent. In case the currently active and the received library identity evidence data extraction config are identical, the process continues with step 323. Otherwise, step 322 is executed which stores the received library identity evidence data extraction config data and uses it instead of the currently active library identity evidence data extraction config data.

Step 322 may, in some embodiments, also re-evaluate previously observed library loading events and extract new library identity evidence data from those previously loaded libraries.

Step 323, which is executed after step 322 or 321, determines whether the received vulnerability monitoring config data contains vulnerable API instrumentation configuration and the receiving agent is an in-process agent 110. In case one of those conditions is not true, the process ends with step 327.

Otherwise, step 324 is executed which determines whether the receiving in-process agent supports re-instrumentation of already loaded executable code. In case re-instrumentation is supported, step 326 is executed, which applies the new vulnerable API instrumentation configuration and instruments potentially vulnerable APIs according to the received configuration update. If otherwise re-instrumentation is not supported, step 325 is executed which stores the received vulnerable API instrumentation configuration and reports that the receiving in-process agent currently uses outdated instrumentation and requires a restart. The new vulnerable API instrumentation configuration will then be applied on the next restart of the process to which the in-process agent is deployed. After step 325 or 326 the process ends with step 327.

Coming now to FIGS. 4a-4e which shows flow charts of various processes executed by in-process 110 and OS agent 114 to instrument application and library API code and to create transaction trace, vulnerable API call and topology reporting data.

FIG. 4a describes the cyclical topology reporting performed by OS agents and in-process agents to provide topology data describing host computing system/operating system on which an OS agent is running, processes executed by the operating system and all communication activities performed by those processes. The process is executed cyclically and starts with step 400, e.g., when a specific time since the last execution of the topology reporting process is elapsed.

The topology identifier of the entity to which the reporting agent is deployed, the topology identifier of a parent entity and descriptive data of the entity are determined in step 401.

For in-process agents, the topology identifier may identify the process to which they are deployed, and the parent topology identifier may identify the container or the operating system executing the process. Fetched entity descriptive data may include the command line used to start the process, name of the user that started the process, privileges of the process and resources, like e.g., amount of main memory assigned to the process.

OS agents may provide a topology identifier that identifies the host computing system/operating to which they are deployed. In case an OS agent is executed on a virtualized host computing system and data is available on the observed host computing system to identify the hypervisor provisioning the virtualized host computing system, the OS agent may provide a parent topology identifier that identifies the hypervisor. Entity descriptive data may for OS agents include vendor, name and version of the monitored operating system, network addresses of the host computing system, hardware resources of the host computing system, like amount of main installed memory, number, capacity, and type of installed hard disks, number, type and speed of installed CPUs and vendor, type, and version of the host computing system.

The fetched and determined data may be used in following step 402 to create topology entity records 260. Step 402 may further send created topology entity records to a monitoring server 140.

The topology identifiers and parent topology identifiers created in step 401 may be derived from properties of monitored entities that identify those entities and that are typically not changing. Example properties include the command line of a process, or the network address of a host computing system. In some embodiments, the generation of topology identifiers is not performed by agents 110/114. Instead, the properties of monitored entities that may be used to derive topology identifiers may be transferred to a monitoring server and the calculation of a corresponding topology identifier may then be performed on the monitoring server.

Step 403, which may only be executed by OS agents 114, fetches child topology data, like e.g., data describing and identifying processes executing on the operating system monitored by the OS agent. Step 403 may in addition fetch low-level communication data, like e.g., data describing currently established TCP/IP connections, or currently active TCP/IP server ports of processes executing on an operating system monitored by an OS agent. The fetched child topology and low-level communication data may be used to create corresponding topology communication records 270, which are sent to a monitoring server. Fetched TCP/IP connection data typically includes data describing both network endpoints of the connection, e.g., in form of network addresses and ports and data describing the communication role (client/server) of each endpoint.

The process then ends with step 404.

The process of reporting the loading of libraries, including the gathering of library identity evidence data, as e.g., performed by in-process agents 110 or OS agents 114, is described in FIG. 4b.

The process starts with step 410, when it is detected that a process loads a library for execution, either via a loading sensor 113 placed by an in-process agent into code that loads a library, or due to an observation of an OS agent that indicates a process accessing a library for loading and execution.

Following step 411 determines load event identifier and load event timestamp, where the load event timestamp specifies the time when the library loading occurred and the load event identifier in addition identifies the process that performed the library loading. In some embodiments, the load event identifier may also identify name and location of the file that was loaded. Processes typically use operating system functionality to access and load files from a file system and operating systems may keep track of file accesses performed by processes. OS agents may either get notifications about file accesses by processes, or they may cyclically query file access bookkeeping data maintained by operating systems to detect file access activities by processes. Those or other mechanisms may be used by OS agents to detect file access activities of processes.

Afterwards, 412 is executed, which may first determine the technology type of the process that performed the detected library loading and then fetch library evidence data extraction configs records 230 with a technology type 231 matching the technology type of the loading process. Various properties of monitored processes may be analyzed to determine its type, like the command line used to start the process, the binary that the process is executing, or the libraries previously loaded by the process.

Step 413 may then evaluate the extraction method 233 of each fetched library identity evidence data extraction config to determine a corresponding evidence value. Further, step 413 may also derive the evidence type from the executed extraction method. As an example, an evidence type "package managing system/Maven" may be derived from an extraction method that specifies the extraction of evidence values from a POM.xml file, because POM.xml files are used by Maven package managing system to identify libraries and to manage library dependencies.

Following step 414 may then create a library loading evidence data record 240, use data identifying the process that performed the reported library loading to set the loading entity identifier 241, the previously determined loading event identifier and loading event timestamp to set corresponding values 242 and 243 of the created library loading evidence data record and use the evidence values and evidence types determined in step 413 to calculate and set a library identity evidence fingerprint 244. As an example, a hash value calculated from the determined evidence values and types may be used as library identity evidence fingerprint 244. Further, library identity evidence entries 246 may be created for each evidence value 248 and corresponding evidence type 247 and value 248 may be stored in the library identity evidence data set 245 of the created library loading evidence data record 240.

Step 415 sends the created library identity loading evidence data record 240 to the monitoring server and the process afterwards ends with step 416.

In variant embodiments the library identity evidence fingerprint may be used to reduce traffic between agents and monitoring server by e.g., sending full evidence data only on the first observation of the loading of a specific library to the monitoring server. On the event that an agent recognizes a repeated loading of a library, e.g., because a library identity evidence fingerprint is identical with an earlier calculated library identity evidence fingerprint, the agent may only set the fingerprint 244 and leave the evidence data set 245 empty. The receiving monitoring server may then use the fingerprint to restore the evidence data set from previous library loading evidence data records. In yet other variants embodiments, the library identity evidence fingerprint may be calculated on the receiving monitoring server.

FIG. 4c describes the monitoring of transaction executions and the reporting of monitored transactions in form of transaction trace data by in-process agents. The process starts with step 420, when an in-process agent detects the start of a transaction execution by the process into which it is injected. As an example, a request handling method of the process that receives an incoming request may be instrumented with a transaction sensor 111. Receiving the request executes the request handling method and also the instrumented sensor. The sensor may create transaction tracing data describing and identifying the entering transaction.

A transaction trace record 250 may e.g., be created by the sensor instrumented to the request handling method, and a local trace fragment identifier 251 may be determined and set to the transaction trace record. The local trace fragment identifier uniquely identifies a portion of a transaction execution that was performed by one process.

Following step 422 may determine if incoming call data for the recognized start of a local transaction execution is available. Incoming call data may be available if the local transaction execution was initiated by a network request that was received from another process or other entity that may be executed on another host computing system. Incoming call data may not be available for transactions that were triggered e.g., by user interactions that occurred on the process.

Step 423 is executed if incoming call data is available and stores the incoming call data in the incoming call trace data section 252 of the created transaction trace record. Incoming call data may also include data identifying the network endpoint from which the incoming call was received. Data describing and identifying this network endpoint may be stored in the sender network data section 253 of the incoming call trace data section.

In case the incoming call was received from a process or other entity that also has an in-process agent injected, sensors placed in the sending process may have altered the incoming request by adding a local trace fragment identifier that identifies the transaction execution portion on the sending process that caused the sending of the incoming request.

Step 423 may in addition analyze the incoming call data to determine whether it contains such local trace fragment identifier data. In case local trace fragment identifier data is available in the incoming call data, it is extracted by step 423 and stored in the incoming call trace data section 252 as parent trace fragment identifier. Parent trace fragment identifiers may later be used by a transaction trace and topology data processor 141 to identify individual transaction trace records that describe different portions of one transaction executed by different processes and to create corresponding end-to-end transaction trace data describing the whole transactions.

Step 424 is executed after step 422 or 423 and performs the monitoring of the local transaction execution. The activities performed by step 424 may contain but are not limited to monitoring the execution of individual methods related to the transaction execution, including measuring performance, functional and resource consumption parameters of the method execution, capturing method parameter and return values, monitoring and tracing inter-thread communication and monitoring the sending of requests to other processes. Monitoring data captured by step 424 may be stored in the local call processing trace data section 254 of the created transaction trace record 250.

Decision step 425 determines whether local transaction processing initiated the sending of an outgoing call, e.g., to another process. In case an outgoing call was detected, the process continues with step 426, otherwise it continues with step 427.

Step 426 may modify the call message that is about to be sent by the detected outgoing call by adding the local trace fragment identifier to the call message. Step 426 may further create outgoing call trace data 255 describing the outgoing call and store it in the local call processing data section 254 of the created transaction trace record 250.

Step 426 may further fetch data identifying the receiver of the outgoing call, e.g., in form of the network endpoint to which the call is directed and store it in the receiver network data section 256 of the created outgoing call trace data entry 255.

Decision step 427 is executed either after step 425 or 426 and verifies whether local transaction processing is finished. Local transaction processing is e.g., finished when the execution of the outermost method that received the call that triggered the transaction execution is finished. In case local transaction processing is not finished, the process continues with step 424, otherwise step 428 is executed which sends the previously created and updated transaction trace record to the monitoring server. The process then ends with step 429.

The process performed to instrument library API methods or functions with potentially vulnerable API sensors 112 is shown in FIG. 4*d*.

The process starts with step 430, when code containing functions or methods that match the API signature pattern 203 of a vulnerable API instrumentation config 200 is loaded. In-process agents 110 may monitor the loading of code fragments like classes for execution and extract metadata describing those code fragments. This metadata may also contain data describing the signatures (name of method/function, sequence of parameter types, return values) of methods or functions contained in those code fragments. This extracted signature data may be compared with API signature pattern data 203 of vulnerable API instrumentation config records. In case an extracted signature matches an API signature pattern, the method or function to which the signature belongs may be instrumented with a potentially vulnerable API sensor 112.

Following step 431 may inject code into the identified API method that fetches the signature of the method, the values of method call parameters and return values, and that determines whether the API call was performed in the context of a monitored transaction and that in this case fetches the local trace fragment identifier of the currently ongoing monitored transaction.

Transaction sensors 111 may store a local trace fragment identifier of an ongoing transaction in a thread local storage of threads that are involved in the transaction execution. Such thread local storage is accessible for all code that is executed by the thread. To determine whether a monitored transaction is currently ongoing, a vulnerable API sensor may check whether the thread local storage contains such a local trace fragment identifier. The vulnerable API sensor may also read the local trace fragment identifier to identify the surrounding transaction execution.

Step 432 may inject code into the identified method that fetches or produces the instrumentation identifier 202 of the vulnerable API instrumentation config 200 that caused the placement of the sensor. Step 432 may e.g., create a constant with the value of instrumentation identifier which may later be used during the execution of the sensor to set the instrumentation identifier 211 of created vulnerable API call records 210.

Following step 433 may inject code that creates and sends a vulnerable API call records 210 using previously fetched data. The process then ends with step 434.

FIG. 4*e* describes the execution of a vulnerable API sensor. A vulnerable API sensor is executed whenever the API method or function into which it is instrumented gets executed. The process starts with step 440 when a sensor execution is triggered due the execution of the method into which the sensor was instrumented, e.g., as described in FIG. 4d.

In step 441 the sensor may capture the signature data of the called method, the captured signature data may contain but is not limited to a name of a class containing the called method, name of the called method, names, and sequence of call parameter types, return value types, declared exceptions and annotations of class and method.

Step 442 may then capture the values of parameters used for the observed method call and the return value generated by the method execution. Subsequent step 443 may then fetch the instrumentation identifier, which may be used to set the instrumentation identifier 211 of a vulnerable API call record describing the recorded API call. Afterwards, step 444 determines the transaction monitoring context, e.g., by checking whether a local trace fragment identifier is stored in the thread local storage, and in case one is available, store it in the local trace fragment identifier field 221 of a vulnerable API call record describing the observed API call.

Following step 445 may create a vulnerable API call record using previously fetched data and send it to the monitoring server 140. Step 445 may in addition fetch the entity identifier of the process on which the reported API call was observed and set it to the calling entity identifier 222 field of the created vulnerable API call record. The process then ends with step 446.

Coming now to FIGS. 5a-5e, which describe various data records that may be used to describe a topological model of the monitored environment and transaction executions observed on the monitored environment in form of end-to-end transaction trace data. Both topology model and transaction trace data may include data describing the loading of libraries and the calls of library APIs.

FIG. 5a describes a topology entity node 500, which may be used to describe topology representations of entities of a monitored environment. A topology entity node may contain but is not limited to entity identifier data 501, which identifies a topology entity and the corresponding entity of a monitored environment described by the entity node, entity type data 502 defining the type of the described monitored entity, like host computing system, container, process or service, descriptive data 503 further describing the monitored entity, vulnerability evidence data 504, containing evidence for the loading of vulnerable libraries, potentially vulnerable API call data 506, describing reported calls of potentially vulnerable APIs, sensitive data storage information 507 to determine whether the described monitored entity stores sensitive data, and in case sensitive data is stored, also the sensitivity grade of the stored data and an observability status 509, describing e.g. whether a process is monitored only via an OS agent which can only provide monitoring data that is accessible for an outside observer or via an in-process agent which may also provide internal monitoring data.

A library loading activity list 505 of a topology entity node 500 may contain multiple library loading evidence data records 240, as e.g., created by agents on observed library loading events.

Potentially vulnerable API call lists 506 may contain multiple vulnerable API call records 210, as e.g., created by in-process agents on observed calls of potentially vulnerable APIs.

Sensitive data storage information 507 may contain, next to an indicator whether sensitive data is stored on a specific monitored entity, also a sensitivity grade for the stored data, which may specify whether the stored data is e.g., anonymized, personal, personal sensitive, financial or health related etc.

A topology entity node describes and identifies a monitored entity, contains evidence data describing the libraries loaded and used by the entity, existence of sensitive data on the entity and the observability status of the entity.

This data may be used to determine whether the entity is affected by a vulnerability. In case a vulnerability is detected, this data may be used, together with other data, to determine a priority of the identified vulnerability. A high priority of an identified vulnerability indicates either high risk on an exploit, high probability of an exploit or both, and is an indicator to prioritize the fix of the vulnerability.

Coming now to FIG. 5b, which describes topology technology layer relationships 510. Topology layer technology relationships may be used to represent vertical relations in a topology model, like e.g., to describe for a process the host computing system on which it is running. A topology technology layer relationship 510 may contain but is not limited to a parent entity identifier 511, typically identifying a surrounding or supporting entity, and a child entity identifier 512, typically identifying a contained or consuming entity. As an example, a parent entity identifier may identify a host computing system and a corresponding child entity identifier may identify a process that is executed on the host computing system.

Topology communication relationship records 520, as shown in FIG. 5c, may be used to describe monitored communication activities that were observed between two entities from which at least one was monitored. A topology communication relationship record 520 may contain but is not limited to client endpoint data 521, which describes and identifies the entity that initiated a monitored communication, server endpoint data 524, describing and identifying the entity that received and served a communication request, communication type data 527, which describes the type of the monitored communication, and a trust/exposure status which indicates whether at least one of the communicating entities is not trusted and/or the observed communication activity crossed a trust boundary.

Client endpoint data 521 and server endpoint data 524 may contain but are not limited to observed network data 522/525, which contains data describing an endpoint of a monitored communication, e.g., in form of a network address and a communication port, and an optional entity identifier 523/526 that identifies the topology entity node 500 describing the monitored entity that was involved in the communication. Observed network data 523/525 may always be available, as long as one of the two communicating entities is monitored by an agent. Typically, network endpoint data for both endpoints involved in a communication activity is available on both involved entities and agents deployed to an involved entity may capture and provide network data for both endpoints. Therefore, observed network data 522/525 is available for both communication endpoints, even if only one of them is monitored by an agent.

Entity identifiers 523/525 may only be available for communicating entities which are observed by an agent.

Topology entity nodes 500, topology technology layer relationships 510 and topology communication relationships may be used to create a topology model of a monitored environment, where topology entity nodes describe entities of the monitored environment, like host computing systems, containers or processes and topology technology layer relationships 510 and topology communication relationships 520 describe structural and communication related connections between those entities.

A transaction processing record 530, as described in FIG. 5*d* may be used to describe processing activities corresponding to the execution of an individual transaction that were performed by a process. A transaction processing record 530 may contain but is not limited to a local trace fragment identifier 531, which identifies an individual sequence of processing steps performed by a process to executed an individual monitored transaction, an entity identifier 532, which identifies topology entity node 500 representing the process in a topological model of the monitored environment, local activity trace data 533, containing the detailed monitored processing activities, including monitoring data describing outgoing calls to other processes, and a potentially vulnerable API Call list 534, which contains data describing observed calls to potentially vulnerable APIs that were observed during the transaction execution. The potentially vulnerable API Call list 534 may contain an entry similar to a vulnerable API call record for each observed call to a potentially vulnerable API. Local activity trace data 533 may also contain data describing an incoming request that trigged the local transaction execution, together with sender network data identifying and describing the network endpoint from which the incoming request was received. Data contained in the incoming call trace data section 252 of a received transaction trace record may be used to enrich local activity trace data 533 with data describing the triggering incoming call or request.

Transaction communication records 540, as shown in FIG. 5*e*, may be used to describe communication activities between processes that were performed during the execution of monitored transactions. A transaction communication record 540 may connect a transaction processing record 530 describing a portion of a monitored transaction that performs an outgoing call sent by a first process, with a transaction processing record 530 that describes the processing performed on a second process that received and processed of the call from the first process.

A transaction communication record 540 may contain but is not limited to client 541 and server 544 endpoint data, describing and identifying the process local transaction processing records that describe sending and receiving/processing of an outgoing call, trust/exposure status date 547, describing whether the observed transaction communication crossed a trust boundary or whether one of the entities involved in the communication is not trustable, and communication type data 548, describing the type observed communication in detail, e.g. by specifying a used communication method and protocol (e.g. RMI, HTTP/S, etc.).

Transaction processing records 530 and transaction communication records may be used to represent monitored end-to-end transactions. Further, transaction processing records may be used to enrich a topology model with data describing services provided by processes and transaction communication records may be used to extract data describing service call dependencies, which may also be stored in the topology model. In some examples, topology communication relationship records 520 may be used to represent service call dependencies.

Coming now to FIGS. 6*a*-6*f*, which describe the processing of monitoring data that was received from agents 110/114 by various components of a monitoring server 140.

FIG. 6*a* describes the processing of topology entity records 260 by a transaction trace and topology data processor 141. The process starts with step 600, when a topology entity record 260 is received by a transaction trace and topology data processor 141. In following step 601, the transaction trace and topology data processor 141 may determine whether the topology model 153 already contains a topology entity node 500 with an entity identifier 501 matching the entity identifier 261 of the received topology entity record. In case a matching topology entity node already exists in the topology model it may be updated or supplemented with data from the topology entity record. If no matching topology entity node 500 exists, a new one may be created using the data of the received topology entity record and stored in the topology model. In this case, also a topology technology layer relationship records 510 may be created using entity identifier 261 and parent entity identifier 262 of the received topology entity record to describe the structural dependencies (e.g., for a process a dependency to the container/host computing system executing the process) of the new topology node. The process then ends with step 602.

FIG. 6*b* describes the processing of topology communication records 270 by a transaction trace and topology data processor 141. The process starts with step 610, when a new topology communication record 270 is received by a transaction trace and topology data processor 141.

Following step 601 may first try to determine the topology entity nodes 500 corresponding to the received endpoint data. If entity identifier data is already available in client/server endpoint data 272/274 of the received topology entity record 270, this may be used to identify the corresponding entity nodes 500. Otherwise, observed network address data may be used to identify corresponding topology entity nodes. Afterwards, a topology communication record 520 may be created and its observed network data 522/525 of client and server endpoint data 521/524 may be set with corresponding data from the received topology communication record. In case entity identifier data for the client or server endpoint were received or calculated, they may be set to the corresponding entity identifier field 523/526 of the client/server endpoint data 521/524.

In case one of the entities involved in an observed communication activity is not monitored by an agent, the corresponding entity identifier 523/526 of a topology communication relationship describing the communication may either empty or indicate a not existing topology entity node.

Following step 612 analyzes the created topology communication relationship to determine its trust/exposure status. This analysis may include but is not limited to determine which of the involved entities is within a trusted network address range or which of the involved entities is observed by an agent. In some embodiments the trusts/exposure status may also include whether the client side or the server side is not trustable.

The process then ends with step 613.

Coming now to FIG. 6*c*, which describes the processing of transaction trace records 250 by a transaction trace and topology data processor 141. The process starts with step 620 when a transaction trace record is received by a transaction trace and topology data processor 141. Following step 621 creates or updates end-to-end transaction trace data, e.g., in form of transaction processing records 530 that are connected via transaction communication records 540 out of transaction trace fragments received from agents e.g., in form of transaction trace records 250. Step 620 may e.g., use incoming call data 252 and local call processing data 254 of received transaction trace records to create corresponding transaction processing records and use parent trace fragment identifiers contained in incoming trace data to connect related transaction processing records with transaction communication records 540. Sender network data 253 contained in incoming call trace data 252 and receiver network data 256 contained in outgoing call trace data 255 of received transaction trace records may be used to set observed network data 542/545 of created transaction communication records. The communication type 548 may be derived from incoming call trace data 252 or outgoing call trace data 255.

The entity identifier 532 of a created transaction process record may be derived from the agent which sent the transaction trace record from which the created transaction process record was created. Typically, transaction trace records are only sent from in-process agents, which are injected into specific processes with specific entity identifier. Therefore, an in-process agent identifies a specific process and in turn also the entity identifier of this process.

Next to incrementally creating end-to-end transaction trace data out of received transaction trace fragments, step 621 may also analyze incoming call trace data 252 and outgoing call trace data 255 to identify services used by monitored transactions to enter processes. Identified services may be added to the topology model in form of topology entity nodes 500 and connected with topology entity nodes representing the processes providing those services with topology technology layer relationship records 510.

In addition, service call sequences may be extracted from transaction trace data and added to the topology model 153 in form of topology communication records 540. As an example, a monitored transaction may enter a process A using service X. Transaction processing on process A may send an outgoing call to service Y on process B. Corresponding transaction trace data may be used to create a topology communication record indicating that service X depends on service Y. (e.g., by creating a transaction communication record identifying service X as client endpoint and service Y as server endpoint). Topology technology layer records 510, indicating that service X is provided by process A and service Y by process B may also be created and added to the topology model.

Following step 622 may then identify transaction communication that crosses trust borders, or transaction communication involving untrusted entities and update the trust/exposure status of corresponding transaction communication records accordingly.

The trust/exposure status 547 of created transaction communication records may be derived from observed network data 542/545 and observation status (e.g., in-process agent injected, executed on a host observed by an OS agent) of involved communication endpoints, as explained above.

The process then ends with step 623.

The processing of received vulnerable API call records 210 by a vulnerable API call data processor 142 is shown in FIG. 6*d*. The process starts with step 630, when a new vulnerable API call records 210 is received. Following step 631 fetches the topology node 500 corresponding to the entity on which the reported API call was observed. Step 631 may e.g., use the calling entity identifier 222 of the received vulnerable API call record 210 to identify and fetch the corresponding topology entity node 500 with an entity identifier 501 that matches the calling entity identifier.

In embodiment variants where no calling entity identifier is contained in vulnerable API call records 210, step 631 may e.g., identify the in-process agent 114 from which the vulnerable API call record was received, the process into which the agent was injected and further fetch the entity identifier of this process to query the topology model 153 for a topology node 500 with a matching entity identifier.

Afterwards, step 632 may store the received vulnerable API call records 210 in the potentially vulnerable API call list 506 of the topology entity node 500 fetched in step 631.

Subsequent decision step 633 may then analyze the received vulnerable API call records 210 to determine whether it includes transaction context data in form of a local trace fragment identifier 221. The process ends with step 635 when no transaction context data is available. Otherwise, step 634 is executed, which fetches the transaction processing record 530 with a local trace fragment identifier 531 matching the local trace fragment identifier 221 stored in the received vulnerable API call record. The vulnerable API call record is then stored in the potentially vulnerable API call list 534 of the fetched transaction processing record 530. The process then ends with step 635.

Coming now to FIG. 6*e*, which describes the process of setting sensitive data storage information 507 of topology entity nodes. Monitoring data describing entities of a monitored environment may be used to determine whether e.g., a process represents a database system that may be used to persistently store large amounts of data. This monitoring data is typically not sufficient to determine whether sensitive data is stored by the entity or to define a sensitivity grade of the stored data. Therefore, user interaction is required to enter data describing the location of sensitive data to the monitoring system.

The process starts with step 640, when the transaction trace and topology data processor 141 recognizes that a new topology entity node 500 was added to the topology model 153 that is capable for the persistent storage of large amounts of data. Following step 641 notifies a user or administrator of the monitoring system that such an entity was detected and requests information regarding sensitivity status of data that is or will be stored on the new entity. In some embodiments a graphical user interface may be presented to the user/administrator that provides means to specify whether sensitive data is stored and/or a sensitivity grade of the stored data. Following step 642 stores the entered sensitivity data in the sensitivity data storage information section 507 of the new topology entity node 500. The process then ends with step 643.

The processing of received library loading evidence data records 240 by a library evidence data collector 143 is described in FIG. 6*f*.

The process starts with step 650 with the receipt of a library loading evidence data records 240. Following step 651 fetched the topology entity node 500 with an entity identifier 501 matching the loading entity identifier 241 of the received library loading evidence data record from the topology model 153 and subsequent step 652 stores the received library loading evidence data record 240 in the library loading activity list 505 of the topology entity node 500 fetched in step 651. The process then ends with step 653.

Coming now to FIGS. 7*a*-7*c*, which describe data records that may be used to store descriptions of publicly known vulnerabilities, to map placed instrumentation of potentially vulnerable APIs with vulnerability description data causing the instrumentation and to describe identified vulnerabilities of the monitored environment, together with data describing priority/severity of identified vulnerabilities and their location.

A vulnerability report 148, which may be used to describe data about a publicly known vulnerability, that may e.g., be fetched form an external public vulnerability database 150, is shown in FIG. 7*a*.

A vulnerability report 148 may contain but is not limited to a vulnerability report identifier 701, which uniquely identifies the vulnerability, a vulnerability type 702, which specifies the type of the vulnerability (e.g. SQL injection, XSS, etc.), a vulnerability severity level 703 quantifying the general severity of the vulnerability, data describing the affected technology type 704 (e.g. Java, .NET, HTML/JavaScript etc.), an affected library list 705 which identifies libraries that are affected by the vulnerability, fix information data 714 specifying whether a fix for the vulnerability exists optionally also and how it can be applied, and exploit information 715 describing known techniques to exploit the vulnerability. Exploit information may also describe known practiced exploits.

The affected library list 705 may contain multiple library records 706. A library record 706 may contain data identifying an affected library and also data identifying particular portions of the library API that are affected.

A library record 706 may contain but is not limited to a library identifier 707 and an affected API detail data list 713. Library identifiers 707 may contain but are not limited to a vendor identifier 707, identifying the vendor of the library, a product identifier 708 identifying a specific version or product, without specifying its version, and a structured version identifier 710. A structured version identifier 710 may contain a lower bound 711 and an upper bound 712 version, both lower bound and upper bound versions may specify concrete versions or versions containing wildcards. A structured version identifier may be used to express version ranges, like e.g., all versions that are greater or smaller than a specific version or all versions that are greater than a lower bound and smaller than an upper bound. In some embodiments, library identifiers 707 may, instead of a structured version identifier 710, contain a simple version list which contains the versions of libraries that are affected by the given vulnerability, and which share the same affected API detail data (i.e., the affected API is the same for all versions in the version list).

An affected API data detail list 713 may contain multiple API signature entries 212 (see FIG. 2b), which identify API methods or functions of the library that are affected by the described vulnerability.

An instrumentation/vulnerability mapping entry 146, which may be used to associate placed instrumentations of potentially vulnerable APIs with corresponding vulnerability reports 148 is shown in FIG. 7b.

An instrumentation/vulnerability mapping entry 146 may contain but is not limited to an instrumentation identifier 721, which identifies a vulnerable API instrumentation config 200 and a vulnerable library identifiers list 722, containing identifies for all libraries containing the vulnerable APIs that match the vulnerable API instrumentation config 200 identified by the instrumentation identifier 721. Each vulnerable API call record 210 that is sent by a potentially vulnerable API sensor contains, next to data describing an observed API call, an instrumentation identifier 211, which identifies the vulnerable API instrumentation config 210 that was used to place the vulnerable API sensor 112. As an instrumentation/vulnerability mapping entry maps instrumentation identifiers received with API call reports to the vulnerable library identifiers for libraries containing the instrumented vulnerable API, instrumentation/vulnerability mapping entries may be used for a fast and efficient lookup for corresponding library on receipt of a vulnerable API call record.

A vulnerable library identifiers list 722 may contain multiple vulnerable library identifier records 723, which may contain but are not limited to a vulnerability report identifier 724, which identifies a specific vulnerability report 148, and a library identifier 725, which identifies a specific library that is affected by the vulnerability identified by the vulnerability report identifier 724, e.g., by a vendor name, a product name, and a version.

Coming now to FIG. 7c, which shows a vulnerability issue record 159, which may be used to represent identified vulnerabilities in a monitored environment.

A vulnerability issue record 159 may contain but is not limited to a vulnerability issue identifier 731, which identifies the vulnerability issue record 159, a vulnerability report identifier 732, which identifies the vulnerability report 148 describing the found vulnerability, a library identifier 733, which identifies a library, e.g. by a vendor name, a product name and a version, a location independent priority scores section 734, which contains priority scores for the identified vulnerability that are independent from the topological location of the entity on which the vulnerability was observed, and an affected topology entity list 738, describing the locations on which the vulnerability was observed.

A location independent priority score section 734 may contain but is not limited to a native severity score 735, which may be derived from the vulnerability severity level 703 of a corresponding vulnerability report, an exploit score 736, considering the existence of an exploit or data describing observe security breaches based on an exploit as e.g. described in an exploit information section 715 of a corresponding vulnerability report 148, and a fix score 737, considering the existence of a fix, as e.g. described in a fix information section 714 of a corresponding vulnerability report. Native severity score 735, exploit score 736 and fix score 737 may be represented in numeric form, for easy comparison and combination.

Issue location entries 739, may be stored in affected topology entry lists 738 of vulnerability issues 159 and may be used to describe entities on which a vulnerability was observed, together with entity specific observation data regarding the vulnerability, like observed calls of vulnerable API, and with data describing location dependent vulnerability scores, e.g. derived from data describing the exposure of affected entities to untrusted, external entities and the access of sensitive data by those affected entities.

An issue location entry 739 may contain but is not limited to a topology entity identifier 740, which identifies a topological entity, and in turn also an entity of the monitored environment, on which the vulnerability was observed, a vulnerable API call list 741, containing vulnerable API call records 210 describing calls to vulnerable APIs of the vulnerable library identified by the vulnerable report identifier 732 and library identifier 733 of the enclosing vulnerability issue 159 that were observed on the entity identified by the topology entity identifier 740 and a location-specific priority score section 743 containing priority scores for the vulnerability that consider the topological location of the entity on which the vulnerability was observed.

Location-specific priority scores 743 may contain but are not limited to an API usage score 744, which considers observed calls to vulnerable APIs of an affected library, a topology exposure score 745, which considers topological communication links of an entity on which a vulnerability was observed and a transaction exposure score, which considers transaction tracing data describing end-to-end transactions that include calls to vulnerable APIs of an affected library.

The API usage score 744 may e.g., consider the existence of vulnerable API calls, their frequency, and their number.

The topology exposure score 745 may e.g., consider direct and indirect topology communication links that connect the entity on which a vulnerability was observed with a trust boundary or with untrusted, external entities and that connect the entity with entities storing sensitive data. The topology exposure score 745 may consider the topological distance between an affected entity and external entities or entities storing sensitive data. In addition, the topology exposure score may consider for an entity whether only either external exposure or sensitive data access or a combination of both is observed.

A transactional exposure score 746 may analyze transactions that performed calls to vulnerable APIs on the affected entity to determine whether those transactions origin from untrusted, external sources and/or access sensitive data. Existence of such transactions, their number and frequency may be used to determine a transactional exposure score 746.

Coming now to FIGS. 8a-8c, which shows flow charts of processes that are related to the ingest and processing of publicly known vulnerability report data, to update a unified vulnerability repository 157 and to accordingly update the instrumentation of monitored application processes 101 with potentially vulnerable API sensors 112.

FIG. 8a described the process of updating the unified vulnerability repository 157 with new and updated vulnerability report data from external, public vulnerability databases. Various public vulnerability databases are available for public usage, most of them also providing APIs to access and query structured vulnerability report data. Example vulnerability data bases include the Common Vulnerability and Exposures database (CVE), managed by the MITRE corporation, VULDB, a community managed vulnerability database or the Vulnerability Lab database, managed by the Evolution Security GmbH.

The process starts with step 800, when an update for the unified vulnerability repository 147 is desired. Various events may trigger this process, including the elapse of a cyclic update time since the last process run, an external notification received e.g. from a public vulnerability databases 150 indicating new detected vulnerabilities, or changes in the monitored environment, which introduced new potential attack surfaces, like e.g. detected processes that execute an application platform that was previously not used in the monitored environment.

Following step 801 fetches vulnerability data from external vulnerability databases, e.g., using APIs provided by those databases. Step 801 may either fetch vulnerability data from one or multiple public vulnerability databases 150. Further, step 801 may either fetch all vulnerability data that is available on a vulnerability database or may it only fetch these vulnerability data or vulnerability reports that were created or updated since the last update.

Afterwards, step 802 may analyze the fetched vulnerability data and create a new vulnerability report 148 for each unknown vulnerability in imported vulnerability data. Imported vulnerability data is typically structured in individual vulnerability reports, similar to vulnerability reports described in FIG. 7a. In most cases, such imported reports also contain an identifier, which uniquely identifies a vulnerability report within the scope of a public vulnerability database. However, each public vulnerability database may use its own format and structure and step 802 may also transform vulnerability reports using external formats into an internal format as e.g., described in FIG. 7. A combination of vulnerability database specific report identifier and an identifier for the specific vulnerability database may be used to create vulnerability report identifiers 701. The created vulnerability report identifies may e.g., be used to determine whether an imported vulnerability report is new.

Following step 803 may, for identified new vulnerabilities, extract data identifying the libraries that are affected by the vulnerability. The extracted library identification data may contain a vendor name, a product name, and a version of the library. Vulnerability reports provided by public vulnerability database typically provide this library identification data in a structured format. Step 803 may further create library records 706 for extracted library identification data and store the extracted library identification data in the library identifier 707 section of the created library records 706. The created library records 706 may then be stored in the affected library list 705 of the corresponding vulnerability report 148 created in step 802.

Afterwards, step 804 may, for each affected library that was identified in step 803, analyze the corresponding imported vulnerability report to extract vulnerable API data for the respective affected library. Vulnerability reports provided by public vulnerability database typically provide this vulnerable API data in a structured format. Extracted vulnerable API data may then be used to create API signature records 212 which are stored in the affected API detail data section 713 of the library record 706 that is affected by the vulnerable API.

Following step 805 may then analyze imported vulnerability report data to extract exploit and fix data and set the extracted data to the corresponding sections 714 and 715 of a previously create vulnerability report 148.

Afterwards, step 806 may identify imported vulnerability reports that represent an updated for already known vulnerabilities and update corresponding vulnerability reports 148 accordingly. Step 806 may e.g., use data of imported vulnerability reports describing a last update or a version history of imported vulnerability reports to determine whether they contain an unknown update to an already imported vulnerability. Such updates may contain but are not limited to new detected affected libraries, new detected affected APIs, and updated exploit or fix data.

Following step 807 stores new and updated vulnerability reports 148 in the unified vulnerability repository and subsequent step 808 triggers the global vulnerable API instrumentation manager 144 to process the new and updated vulnerability report data. A detailed description of this process can be found in FIG. 8b.

The process then ends with step 809.

Coming now to FIG. 8b, which describes the update of the vulnerable API instrumentation of processes monitored by in-process agents on new imported vulnerability report data.

The process is executed for each supported technology type (supported technology types may e.g., include Oracle Java®, Microsoft .NET®, PHP, Python, node.js or HTML/JavaScript) and starts with step 810 when the global vulnerable API instrumentation manager 144 receives a request to update the vulnerable API instrumentation.

Following step 811 fetches those vulnerability reports 148 from the unified vulnerability repository 147 that have an affected technology type 704 that matches the currently processed technology type.

Subsequent step 812 processes the vulnerability reports fetched in step 148 by iterating over each library record 706 in the affected library list 705 of the fetched vulnerability reports and extracting the API signatures 212 stored in the affected API detail data 713 of those vulnerability reports 148. The extracted API signatures may then be used to create corresponding vulnerable API instrumentation configurations 200. A detailed description of this process can be found in FIG. 8c.

After vulnerable API configuration records for the updated vulnerability situation have been created by step 812, following step 813 may identify those in-process agents 110 that are deployed to monitored processes 101 that match the currently processed technology type. A monitoring server 140 may maintain a repository (not shown) describing all connected in-process agents, which also contains data describing the technology type of the processes to which those agents are deployed. Step 813 may query this repository to identify matching in-process agents.

Following step 814 may then send the vulnerable API configuration records created in step 812 to the in-process agents identified in step 813. In some embodiments, step 813 may be skipped, and step 814 may send the vulnerable API configuration records to all connected in-process agents. In such embodiments, receiving in-process agents 110 may, on receipt of vulnerable API configuration records, compare the technology type 201 of received vulnerable API configuration records with the technology type of the processes they are deployed to, and discard vulnerable API configuration records that do not match their technology type.

The process then ends with step 815.

FIG. 8c shows the process of creating vulnerable API configuration records 200 out of API signatures 212 describing vulnerable library APIs.

The process starts with step 820 and may be executed for each API signature contained in affected API detail data of a library that is affected by a vulnerability.

Following step 821 calculates an instrumentation identifier for the currently processed API signature, e.g., in form of a hash value derived from the API signature data (e.g., class name, method name, method parameter and return types) and library identifier data (vendor and product name and version) of the library providing the affected API.

Following step 822 may query the instrumentation vulnerability mapping repository 145 for an instrumentation vulnerability mapping entry 146 with an instrumentation identifier 721 matching the instrumentation identifier calculated in step 821.

Subsequent decision step 823 executed step 824 if no matching instrumentation vulnerability mapping entry 146 was found, otherwise step 824 is skipped.

When step 824 is executed, it creates a new instrumentation vulnerability mapping entry 146 and sets its instrumentation identifier 721 to the instrumentation identifier value calculated in step 821. The created instrumentation vulnerability mapping entry is stored in the instrumentation vulnerability mapping repository 145.

Step 825 afterwards creates a new vulnerable library identifier 723, using the vulnerability report identifier 701 of the currently processed vulnerability report 148 and a library identifier 725 using library identification data (e.g., 707-710) of the currently processed library record 706. Step 826 then stores the created vulnerable library identifier 723 in the vulnerable library identifiers list 722 of the previously fetched or created instrumentation vulnerability mapping entry 146.

Following step 827 creates a vulnerable API instrumentation configuration 200 for the received API signature, using the currently processed technology type (see FIG. 8b), the instrumentation identifier calculated in step 821 and API signature data from the currently processed API signature record 212. Subsequent step 828 provides the created vulnerable API instrumentation configuration 200 for further processing, e.g., by the process described in FIG. 8b. The process then ends with step 829.

Maintaining a mapping between placed vulnerable API sensors and vulnerability reports/vulnerable APIs that caused the placement of those sensors, together with vulnerable API sensor executions providing report data that contains identification data (instrumentation identifier) of the sensor creating the report data greatly eases the identification of corresponding vulnerabilities/affected libraries for received vulnerable API call report data. Only a query for an instrumentation vulnerability mapping entry 146 with the instrumentation identifier data of received vulnerable API call report data is required to identify the corresponding vulnerability and affected library.

Coming now to FIG. 9, which shows an exemplary topology model of a monitoring environment to illustrate various exposure and sensitive data access scenarios for identified vulnerabilities.

The topology model describes a trust boundary 900 which separates trusted entities, that are situated within the trust boundary, those are typically host computing systems, processes etc. that are operated by the owner/operator of the monitored environment, and untrusted entities, which are typically host computing systems, processes, etc. that are not operated by the owner/operator of the monitored environment, like e.g., web browsers operated by users of the monitored environment.

Applications, including mobile applications and web browsers 901 are operated by users of the monitored environment to interact with specific entry services (e.g., 903, 904 or 915) provided by the monitored environment.

The monitored environment may contain a set of processes 902, 907, 910, 914 and 920 that operate within the trust boundary 900 and that are monitored by in-process agents (not shown in FIG. 9). Those processes may be executed on one or multiple host computing systems (also not shown in FIG. 9). Those processes may communicate with other processes within the trust boundary or with entities outside the trust boundary, like external credit card service 925, to fulfill various tasks, including requests 930, 931 and 932 received from external applications or web browsers 901.

To illustrate different exposure and sensitive data access scenarios, it is assumed that the monitored processes 902, 907, 910 and 920 within the trust boundary are affected by a vulnerability.

A scenario describing the exposure of a vulnerability that is indicated both by topology communication data and by transaction trace data is started with request 930 sent from an external app/browser 901 to monitored service 903 of frontend process 1 902. Monitored service 903 starts to record a monitored transaction, which reports activities 933 caused by the received request. Those activities include 934 the execution of an API that is affected by a known vulnerability 905, which is reported by a vulnerable API sensor 112. The combination of transaction and vulnerable API call reporting provides evidence that a transaction that was originated from an untrusted, external source (app/browser 901) also called a vulnerable API.

Request 931, which is sent by an external entity to unmonitored service 904 describes an exposure scenario without transaction trace evidence. The request 931 may e.g., be recorded by an OS agent 114 and created reporting data may be used to update the topology model to indicate that front end process 1 provides unmonitored service 904 and that this service is accessible from outside the trust boundary 904. The subsequent processing 935 of request 931 remains unmonitored, except a call 936/906 to a vulnerable API which is registered by a placed vulnerable API sensor 112. In this scenario, only evidence of a vulnerable API call and, according to existing monitoring data, unrelated evidence for external access to the process on which the vulnerable API call was observed is available.

Transaction trace data backed evidence that shows a causal relationship between external access and vulnerable API call may be given higher weight than a combination of reported vulnerable API calls without transaction context and topology-backed exposure evidence of the entity on which vulnerable API calls were observed.

A monitored transaction may be started on internal process 907, e.g., due to a trigger event 908 that may be caused by an interaction of an operator of the monitored environment with internal process 1 907. The processing 937 of the trigger event may be monitored and contain 938/909 a call to a vulnerable API. Processing of the trigger event 908 may be performed by internal process 907 without interacting with other processes. Transaction tracing and vulnerable API call monitoring in this scenario creates evidence for a transaction that included a vulnerable API call. The transaction was initiated using a trusted entity (907). An automated vulnerability prioritization mechanism may assign a priority to the vulnerability identified on internal process 1 that is lower than the priority of the vulnerabilities identified on frontend process 1 902, because internal process 1 is not exposed to external entities.

Another monitored transaction may be started by a monitored trigger event 911 on internal process 902. The monitored processing 939 of the trigger event 911 may include 940 a call of a vulnerable API 912. In addition, the processing may also perform a monitored service call 913 which interacts 946 with sensitive data storage 924. The combined transaction tracing and vulnerable API call data creates evidence of an access to sensitive data in combination with a call to a vulnerable API. However, the processing was initiated by a trusted entity. A scenario as observed on internal process 2 910 may get a higher priority assigned than the scenario of internal process 1, because it also includes access to sensitive data. It may however get a lower priority than the scenarios observed on front end server 1, because no evidence for an exposure to external entities is given.

Another scenario is started by request 932 that is sent from an external app/browser 901 to monitored entry service 915 of front end process 2 914. The processing of request 932 by front end process 2 914 is monitored until it reaches monitored service call 917, which sends a request 918 to monitored service 919 of back end process 1 920. A vulnerable API call 944/921 is observer during the processing of request 932 on back end process 1. The monitored processing also includes the execution of monitored service call 922, which interacts 947 with sensitive data storage 924. The vulnerability scenario observed on front end process 2 914 and back end process 1 may be assigned a priority that is higher than the priorities of all previously discussed scenarios because it describes a causally related receipt of a request from an untrusted source, the execution of a vulnerable API and the access of sensitive data.

The processing of back end process 1 may also include a branch 945 that performs a monitored service call 923 that interacts 948 with an external service holding sensitive data, like an external credit card service 925. Accesses to external services holding sensitive data may be treated equally as accesses to internal services that hold sensitive data for the priority score calculation of detected vulnerabilities.

Coming now to FIGS. 10a-10c, which provides flow charts of processes that are related to the detection of vulnerabilities in a monitored environment and to the calculation of priority scores of those vulnerabilities.

FIG. 10a provides the flow chart of a process that analyzes library loading evidence data 240 provided by in-process agents 110 or OS agents 114 to identify entities of a monitored environment that are affected by known vulnerabilities.

The process starts with step 1000, either when a specific time (1 minute, 5 minutes, 1 hour etc.) since the last execution of the vulnerability detection process has elapsed, when new or updated vulnerability reports 148 are available or when specific changes of the monitored environment are observed, like deployment of new software versions or libraries or the addition of new entities, like host computing systems or processes, to the monitored environment. The process may be executed for all library loading events that were observed since the last execution of the process, e.g. when it is triggered due to an elapsed time since its last execution, it may be executed for all observed library loading events when it was triggered by newly added or updated vulnerability reports or it may be executed only for library loading events observed on entities that were added to the monitored environment in case it was triggered due to a change of the monitored environment.

Following step 1001 analyze data of a currently processed library loading evidence data record 240 to determine library identification data, e.g., consisting of a vendor name, a product name, and a version. Library identity evidence entries 247 stored in library the library identity evidence data set 245 of the currently processed library loading evidence data record 240 may be used to determine the library identification data.

Subsequent step 1002 queries the unified vulnerability repository 147 for vulnerability reports 148 containing a library entry 706 in their affected library list 705 that matches the library identification data determined in step 1001. In case the query executed by step 1002 returns no matching vulnerability report 148, the process may end (not shown).

Following step 1003 may then, for each vulnerability report fetched by step 1002 identify library entries 706 matching the library identification data determined in step 1001. Vulnerability reports and identified library entries may then be used to create or update corresponding vulnerability issues 159, as described in detail in FIG. 10b.

The process then ends with step 1004.

Coming now to FIG. 10b, which describes the creation or updating of vulnerability issues 159 on receipt of a monitoring library loading event that indicates the loading of a library that is affected by a known vulnerability.

The process starts with step 1010, when library loading event data, e.g., in form of a library loading evidence data record, extracted library identification data, identification data of the topology entity that performed the observed library loading and a vulnerability report, describing a vulnerability that affects the identified library are received.

Following step 1011 may query previously created vulnerability issues 159 for a vulnerability issue 159 with a vulnerability report identifier 732 that matches the vulnerability report identifier 701 of the of the received vulnerability report and a library identifier 733 that matches the received library identification data.

Decision step 1012 executes step 1013 if no matching vulnerability issue 159 was found. Otherwise, decision step 1012 skips step 1013 and continues with step 1014.

In case step 1013 is executed, it creates a new vulnerability issue 159, sets its vulnerability issue identifier 731 to a unique value and sets its vulnerability report identifier 732 to the vulnerability report identifier of the receive vulnerability report. The library identifier of the created vulnerability issue is initialized using the received library identification. Afterwards, step 1013 may set the location-independent priority score data 734 of the created vulnerability issue. The native severity score 735 may be derived from the vulnerability severity level 703 of the received vulnerability report, the exploit score 736 may be derived from available exploit information 715 and the fix score 737 from available fix information 714.

Step 1014 afterwards calculates topology location dependent data of the fetched or created vulnerability issue, as described in detail in FIG. 10c.

The process then ends with step 1015.

Coming now to FIG. 10c, which describes the creation of topology location specific data for a vulnerability issue. The process starts with step 1020, when a vulnerability issue 159 with already set location independent data (e.g., 731-737) is received together with the topology entity node on which the vulnerability described by the received vulnerability issue was observed.

Following step 1021 may create an issue location entry 739, set its topology entity identifier 740 to the entity identifier 501 of the received topology entity node 500 and store the created issue location entry 739 in the affected topology entity list 738 of the received vulnerability issue 159.

Afterwards, step 1022 may fetch those vulnerable API call records 210 contained in the potentially vulnerable API call list 506 of the received topology entity node 500 that represent calls to the API of the library that is identified by the library identifier 733 of the received vulnerability issue 159. Step 1022 may e.g., utilize the instrumentation vulnerability mapping repository 145 to perform this task. Each vulnerable API call records 210 contains an instrumentation identifier 211 and step 1022 may query the instrumentation vulnerability mapping repository 145 for instrumentation vulnerability mapping entries 146 with matching instrumentation identifier 721. The vulnerable library identifier lists 722 of the fetched vulnerability mapping entries may then be queried for vulnerable library identifiers with a vulnerable report identifier 724 and a library identifier 725 that matches corresponding data of the received vulnerability issue 159.

Vulnerable API call records 210, for which at least one matching vulnerable library identifier 722 was found in the vulnerable library identifiers list 722 of their corresponding for instrumentation vulnerability mapping entries 146, are stored in the vulnerable API call list 741 of the issue location entry 739 created in step 1021.

Following step 1023 may then analyze existence, number, and frequency of observed calls to a vulnerable API of the currently processed library to calculate an API usage priority score 744. In general, a higher number and higher frequency of observed vulnerable API calls may lead to a higher API usage priority score.

It is noteworthy that the combined existence of library loading data indicating the loading of a vulnerable library by an entity (e.g., process) and recorded call data of vulnerable APIs of this library on the same entity are indications that the vulnerable library is not only loaded but also used by the entity. A combined observation of loading and usage of a vulnerable library may be used as an indicator to assign a corresponding vulnerability issue a higher priority.

Step 1024 may then analyze the topological connections of the entity on which the vulnerability was observed to external entities and to entities storing sensitive data to determine a topology exposure priority score 745. A detailed description of the processing performed by step 1024 can be found in FIG. 11a.

Afterwards, decision step 1025 checks whether vulnerable API call list 741 of the created issue location entry contains at least one vulnerable API call record 210 with set transaction context data 220. In case no vulnerable API call records with set transaction context data exist, the process ends wits step 1027. Otherwise, step 2026 is executed, which evaluates the vulnerable API call records with set transaction context data to determine a transaction exposure priority score 746, which is described in detail in FIG. 11b.

The process then ends with step 1027.

Coming now to FIGS. 11a-11b, which describe flow charts of processes related to the calculation of priority scores out of topology and transaction trace data.

FIG. 11a describes the calculation of an exposure score that is based on the topological connections of an entity on which a vulnerability was observed.

The process starts with step 1100, when a topology entity 500, on which a vulnerability, e.g., described by an also received issue location entry 739, was received.

Following step 1101 analyzes the topological connections of the received entity, to determine whether a connection between an untrusted, external entity and the received entity exists. The topology model 154 of a monitored environment represents the entities (e.g., processes, host computing systems) of the monitored environments as nodes and communication activities between those entities as directed edges. The direction of those edges is derived from the direction of the monitored communication and always points from the initiator/client/sender of a communication to the acceptor/server/receiver.

To determine whether a topological connection between the received entity and external entities exists, step 1101 may e.g., recursively follow incoming edges of the received node against their direction until either an entity with no incoming edges is reached, or until a communication edge crosses a trust boundary 155. Various graph search algorithms known in the art may be used to perform this task.

Following decision step 1102 continues with step 1103 if no connection to untrusted entities was found and with step 1104 if at least one such connection was identified.

Step 1103 sets a reachability priority score for further processing that indicates no external reachability.

Step 1104 analyzes identified paths from the received entity to untrusted entities to calculate a reachability priority score. Step 1104 may e.g., consider the number of intermediate entities between the affected entity and external, untrusted entities to calculate a reachability priority score, where the reachability priority score may decrease with an increased number of intermediate nodes. Step 1104 may in addition consider the service call frequencies assigned to topology communication edges on the path between the affected entity and external entities. The reachability priority score may increase with an increased number of service calls.

Step 1105 is executed after step 1103 or 1104 and determines the topological connections between the affected entity and entities that store sensitive data. Step 1105 may start with outgoing communication edges of the affected entity and then recursively follow those outgoing communication edges until either an entity is reached that either stores sensitive data or that has no outgoing communication edges. Decision step 1106 is executed afterwards which executes step 1107 when no connections to entities storing sensitive data was detected and step 1108 otherwise.

Step 1107 sets an access priority score indicating no sensitive data access and step 1108 calculates an access priority score considering the topological distance between the affected entity and accesses entities storing sensitive data and corresponding service call frequencies as already described for the reachability priority in step 1104.

Step 1109 is executed after step 1107 or 1108 and combines reachability score and accessibility score to create a topology exposure priority score 744. Various methodologies may be used to combine those scores, including e.g., calculating a sum, or multiplying them. In addition, the combination may be performed in a way that an exposure priority score that derived from a situation in which both external reachability score and sensitive data access were observed in combination, is always higher than an exposure priority score that was derived from a situation in which either external accessibility or sensitive data access alone were observed.

The process then ends with step 1110.

Some embodiment may also consider the type of the vulnerability that was observed on the affected entity and e.g., determine whether the observed vulnerability requires a specific type of communication (e.g., a vulnerability located in HTTP service code may require HTTP traffic to be exploited) and only consider communication of the specific type for the determination of external reachability and/or sensitive data access.

Coming now to FIG. 11b, which describes an exemplary process for the calculation of a transaction trace based exposure priority score. Observed vulnerable API calls that were performed in the context of monitored transactions may identified, and the monitored transactions may be analyzed to determine whether they were originated from untrusted sources, or they accessed sensitive data. The calculated transaction exposure score 746 may moderately increase by the numbers of transactions that are either originated from external sources or access sensitive data and may excessively increase by the number of transactions that both originated from external sources and access sensitive data. The calculation of a transaction exposure score 746 is optional and may only be performed when vulnerable API calls with transaction context are available.

The process starts with step 1110, when the topology entity identifier of the topology entity on which the vulnerability was observed and corresponding API call records 210 describing the usage of vulnerable APIs on the topology entity, which also have set transaction context data 220/221 is received.

Following step 1111 may fetch the end-to-end transaction traces identified by the local trace fragment identifiers 221 of received vulnerable API call records.

Step 1111 may e.g., query the transaction trace repository 151 for transaction processing records 530 with a local trace fragment identifier 531 that matches a received local trace fragment identifier 221. For returned transaction processing records 530, step 1111 may recursively follow transaction communication records 540 with matching trace fragment identifier 543/546 in client endpoint data 541 or server endpoint data 544. This recursive search returns all transaction processing records 530 and transaction communication records 540 that correspond to a monitored transaction that also performed a call to vulnerable API on the affected entity.

Following step 1112 may analyze the end-to-end transaction trace data fetched by step 1111 and first determine for each of those transactions whether it is originated from an untrusted entity or whether it accesses sensitive data.

Step 1112 may, to determine the external origin of transactions, start from the transaction processing record containing a vulnerable API call and then follow transaction communication records recursively and against service call direction (from server endpoint side to client endpoint side), until either a transaction communication record is reached with a trust/exposure status 547 indicating the crossing of a trust boundary or a transaction processing record is reached for which no incoming transaction communication records 540 are available.

Step 1112 may determine the access of sensitive data in a similar way, e.g. by starting from the transaction processing record 530 containing the vulnerable API call and then recursively following all outgoing service calls in call direction (from client endpoint side to server endpoint side), until either a transaction communication record is reached which is directed to a topology entity node 500 which has sensitive data storage information 507 set to indicate the storage of sensitive data, or a transaction processing record 530 is reached for which no outgoing transaction communication records 540 are available.

The external reachability and sensitive data access state determined by step 1112 may then be used by step 1113 to calculate an exposure priority score for each received transaction. To calculate the exposure scores for each transaction, step 1113 may consider for each transaction whether it shows a combination of external accessibility and sensitive data access (higher score) or only one of both. It may in addition consider the topological distance between an observed vulnerable API call and the crossing of a trust border or the access of sensitive data. Step 1112 may analyze the number of transaction communication records 540 that are between the transaction processing record 530 containing the vulnerable API call and the transaction communication records 540 indicating the cross of a trust boundary or the access of sensitive data. A higher topological distance may lead to a lower priority score.

Afterwards, step 1114 may combine the previously created per-transaction exposure scores to create an overall transaction exposure score 746 for the currently processed vulnerability. Step 1114 may calculate an average, a median or other quantile of available per-transaction exposure scores or may select the highest per-transaction exposure score and use it as overall transaction exposure score 746.

The process then ends with step 1115.

Coming now to FIG. 12, which describes a conceptual process that may be applied to create a combined priority score for observed vulnerabilities that also takes observability level (i.e., internally monitored via in-process agent or only externally monitored via OS agent) of an entity on which a vulnerability was observed into account.

The process starts with step 1200, when a vulnerability priority calculator 158 receives a vulnerability issue 157 an issue location entry 739 for the calculation of a combined priority score.

Following step 1201 may calculate an initial combined score which considers the native severity score 736, the topological exposure situation (topological external accessibility and/or access of sensitive data by the entity on which the vulnerability was observed), and the exploit data (availability of exploit, number of observed breaches using the exploit).

Following step 1202 may determine the observability status of the affected entity and subsequent decision step continues with step 1205 in case the affected entity was only monitored via an OS agent and only limited monitoring data is available. In case the affected entity was also monitored via an in-process agent, the process continues with step 1204.

In case the affected entity was only monitored by an OS agent, step 1205 may increment the combined priority with a factor indicating the uncertainty that calls to a vulnerable API exist. This uncertainty is caused by the fact that OS agents only monitor processes from outside and may recognize interactions of processes with an underlying operating system, like accessing executable library files. OS agents however have no insight into the internal activities of those processes, like calls to vulnerable library APIs.

Following step 1211 may then provide the combined priority score for further processing and the process ends with step 1212.

Decision step 1204 is executed when the process is also monitored by an in-process agent and determines whether the in-process agent recorded any calls to a vulnerable API. In case no vulnerable API calls were recorded, the process continues with step 1207 which may decrement the combined priority score to represent the certainty that no vulnerable APIs where called. This represents the situation in which a vulnerable library was loaded by a process, but at least the part of the API library that is affected by the vulnerability was never used. Step 1211 and following are executed after step 1207.

In case vulnerable API calls were observed, step 1206 is executed, which may first increment the combined priority score with a specific factor that represents the certainty of vulnerable API calls (note: this factor may be greater than the factor applied in step 1205 to represent the uncertainty of vulnerable API calls). Step 1206 may also analyze the number and frequency of observed vulnerable API calls and adapt the combined priority score accordingly. The higher the call number/frequency, the more the combined priority score may be increased.

Following decision step 1208 may then determine whether vulnerable API call records 210 with set transaction context data were received. The process continues with step 1211 if no vulnerable API call records 210 with set transaction context are available.

Otherwise, step 1208 is executed which analyzes the transactions corresponding to vulnerable API call records 210 with set transaction context to determine whether those transactions cross trust boundaries or access sensitive data.

Following step 1209 then adapts the combined priority score according to the transaction exposure status calculated in step 1208. The combined priority score may be decreased if the analyzed transactions show no exposure and/or sensitive data access and increased otherwise. An additional increase of the combined priority score may be performed if transaction trace data shows a combination of crossing a trust boundary and access of sensitive data. After step 1209, the process continues with step 1211.

A simplified calculation of an overall combined priority score for an identified vulnerability of a topology entity my start with the native score 735 of the detected vulnerability, which may be derived from data of the corresponding vulnerability report, like vulnerability severity level 703, fix information 714 and exploit information. The topological and transactional exposure status and sensitive data access status for this entity may afterward be determined, and the native score may then be adapted (e.g., reduced by a constant value or factor if no exposure or sensitive data access was detected, or in other variants, increased by a constant value or factor if exposure or sensitive data access were detected). The extend of the performed adaptation may be smaller if only either exposure or sensitive data access was observer and larger if a combination of both were observed.

Coming now to FIGS. 13a-13e, which provide flow charts that illustrate various applications of the vulnerability monitoring data provided by the proposed system, and a proposed process to close vulnerability issues, e.g., when an application was updated to use a version of a library that is not affected by a previously identified vulnerability.

FIG. 13a describes automatic, cyclical vulnerability reporting. The process starts with step 1300, either when a specific time since the generation of the last vulnerability report has elapsed, or when new vulnerabilities were detected.

Following step 1301 fetches all currently open vulnerability issues 159, subsequent step 1302 may then calculate a combined vulnerability score for the fetched vulnerability issues. Afterwards, step 1303 may be executed which sorts the vulnerability issues 159 by the combined vulnerability score. Step 1304 may then present the priority sorted vulnerabilities to a user of the monitoring system. The process then ends with step 1305.

FIG. 13b described additional processing that may be performed by some variant embodiments on the receipt of new vulnerability report data. It is often desired to rapidly provide updated threat information of a monitored environment on the discovery of new vulnerabilities. Therefore, it may not be sufficient to reconfigure the monitoring system on new received vulnerability reports to create and analyze vulnerability monitoring data for the new vulnerability in the future.

It may be further required on the receipt of new vulnerability report data to also re-analyze existing vulnerability monitoring data to determine whether the monitored system was affected by the new detected vulnerability in the past. Existing monitoring data describing past library loading activities, vulnerable API calls and transaction monitoring data may be reevaluated to generate an initial threat status for a new detected vulnerability at the point in time when the corresponding vulnerability report is feed into the monitoring system.

The process starts with step 1310, when new vulnerability report data is received by the monitoring system. Following step 1311 may then analyze the received vulnerability report data and update the instrumentation of processes executed by the monitored system to also recognize vulnerable API calls corresponding to the newly ingested vulnerability data, as already described in FIGS. 8a-8c.

Following step 1312 may then reanalyze already received library loading evidence data 240 to identify those processes that have loaded libraries affected by the newly received vulnerabilities in the past. Step 1312 may for such identified processes also reanalyze received vulnerable API call records 210 to determine whether the reported vulnerable API call also indicate the usage of newly reported vulnerable APIs.

Step 1312 may in addition analyze the local activity trace data 533 of transaction processing records 530 that was received from in-process agents deployed to processes that were identified to have loaded libraries affected by the new reported vulnerabilities in the past. Similar to potentially vulnerable API sensors 112, also transaction sensors 111 record and report the execution of methods and functions by a process, where the reporting data also contains data describing the signature of called methods or functions. This signature data may be compared with signature data describing newly reported vulnerable APIs to determine whether previously recorded transaction trace data indicates past usage of those newly reported vulnerable APIs.

Step 1313 may then report the identified vulnerabilities corresponding to newly ingested vulnerability report data that were identified using past vulnerability monitoring data. The report created by step 1313 may also contain data indicating that the identified vulnerabilities are based on incomplete observation data as e.g., portions of new identified vulnerable APIs may not have been instrumented when the monitoring data was created. The report may e.g., list APIs that are already covered by previously instrumented potentially vulnerable API sensors 112 and newly detected, vulnerable APIs that are currently not covered by potentially vulnerable API sensors. The report created by step 1313 may not provide an exact picture of the updated threat scenario, but it provides a first estimation of the new threat situation at a very early time.

Subsequent step 1314 may then continue vulnerability monitoring and reporting as already described above. The process then ends with step 1315.

Coming now to FIG. 13c, which describes a process performed by some variant embodiments that automatically detects fixed security issues and close corresponding open vulnerability issues.

The process starts with step 1320 with the start of a new process in the monitored environment. Following step 1321 starts vulnerability monitoring of the new process, e.g., by monitoring its library loading activities and usage of potentially vulnerable APIs.

Step 1321 may in addition create topology identification data that identifies the new process in a topology model of the monitored environment. For processes, this topology identification data may be derived from data that defines the functionality of the process, like e.g., the name of the executable binary that is executed by the process, or the command line that was used to start the process. Hash values may be calculated from those data and used as topological identification data for processes. As a consequence, for a process that is restarted, the same topology identification data may be generated for the process that was executed before and after the restart. This differs from process identifiers (PIDs) typically assigned to process by an underlying operating system to identify processes. The PIDs of a first process executing a binary and being started with a specific command line would differ from a second execution of the same binary using the same command line.

The more stable topology identification data allows the monitoring system to determine whether a new started process corresponds to a new topology entity (new executable and/or new command line) or to an already known one (same executable and same command line).

Following decision step 1322 may analyze the calculated topology identification data for the started process to determine whether it corresponds to a new or an already known topology entity. In case the starting process corresponds to a new topology entity, the process ends with step 1328.

Otherwise step 1323 is executed, which analyzes the library loading performed by the new started process to determine whether it indicates the loading of libraries that were also loaded by a previous run of the process, but where the library versions differ between the runs. Step 1323 may further determine whether vulnerability issues were created during previous process runs due to the loading of vulnerable libraries.

Following step 1324 may determine for the library loading activities for which the library versions differ between a previous and the current process run, whether the library version loaded by the current process run is also affected by a vulnerability.

Subsequent decision step 1325 may, in case the new loaded library version is also affected, end the processing with step 1328. Otherwise, step 1326 may be executed, which identifies vulnerability issues 159 and issue location entries 739 that correspond to those new loaded libraries that no longer show a previously reported vulnerability. Step 1325 may close or remove the identified issue location entries 739 and following step 1327 may report the identified fix of a vulnerability issue to users of the monitoring system.

The process then ends with step 1328.

Coming now to FIG. 13d, which describes the fulfillment of a request for topological entities (e.g., processes) that are affected by a specific vulnerability and that are also either exposed to external access or access sensitive data.

The process starts with step 1330, when a user of the monitoring system provides a specific vulnerability report identifier and requests the monitoring system to search for entities that are affected by the identified vulnerability and that are also exposed to external access or accessing sensitive data.

Following step 1331 may query open vulnerability issues 159 and select those vulnerability issues having a vulnerability report identifier 732 that matches the received vulnerability report identifier.

Subsequent decision step 1332 continues with step 1334 in case no matching vulnerability issue was found. Step 1334 reports that no vulnerability was found back to the requesting user and the process ends with step 1336.

In case matching vulnerability issues were found, step 1333 is executed, which fetches the topology entities (processes) on which the fetched vulnerability issues were observed and analyzes their topological connectivity and observed transactions that executed vulnerable APIs corresponding to the vulnerability identified by the received vulnerability report identifier, to determine the topological and transaction related exposure state of those entities.

Following step reports the entities selected in step 1331 and their exposure status determined in step 1335 back to the requesting user.

The process then ends with step 1336.

Coming now to FIG. 13e, which depicts the process to generate a fix proposal for a specific identified vulnerability on a specific monitored entity. The process may e.g., be triggered when the specific vulnerability is presented to a user of the monitoring system.

The process starts with step 1340, when a fix proposal for a specific vulnerability issue is requested. Following step 1341 may query the unified vulnerability repository 147 for a vulnerability report 148 with a vulnerability report identifier 701 matching the vulnerability report identifier 732 of the received vulnerability issue 159.

Subsequent step 1342 may then extract fix data from the previously fetched vulnerability report and generate fix proposal data indicating the application of the described fix on the received monitored entity.

The process then ends with step 1343.

Coming now to FIGS. 14-16 which show screen shots of exemplary user interfaces that may be used to present vulnerability monitoring results to a user of the monitoring system.

FIG. 14 provides an overview of the threat situation of a monitored system, together with a list of identified vulnerabilities that are sorted by their respective priority or risk level.

An overview of the vulnerability situation providing the number of currently observed high-risk vulnerabilities is shown in section 1400.

A list of open vulnerabilities 1401 is shown below, where each vulnerability is represented by a vulnerability name or identifier 1402, its risk level 1403, which may e.g. provide a coarse segregation of identified vulnerabilities in "High", "Medium" and "Low" risk vulnerabilities, a risk score, 1404 providing a quantified risk score for each vulnerability (the calculation of this risk score may e.g. be performed as described in FIG. 12), a state of the vulnerability, indicating whether it is currently open or fixed/closed, and monitoring data indicating when the specific vulnerability was observed the first 1406 and the last 1407 time.

Coming now to FIG. 15 which provides a screenshot of an exemplary user interface that may be used to present the details of a selected identified vulnerability (e.g., one of the vulnerabilities 1401 presented in the vulnerability list shown in FIG. 14).

A header section 1500 may provide identification data, like a name or identifier of the identified vulnerability and a corresponding descriptive summary.

A status overview section 1501 may visualize different priority dimensions, like an exploit score, an exposure score, a sensitive data access score or a native score of the identified vulnerability. The status overview may in addition show a summary of identified attacks that used the identified vulnerability and the number of entities that are affected by the vulnerability.

A vulnerability issue detail section may provide data describing and identifying entry points 1502 which expose the affected entity to the public internet, data describing affected entities in more detail 1503, together with descriptive data for the vulnerability and references to descriptions of the vulnerability in external, publicly available vulnerability databases 150. A sensitive data access section 1504 may describe observed sensitive data access by the affected entity.

An event history section 1506 may list events corresponding to the selected vulnerability, like e.g., its detection.

A vulnerable libraries section 1505 may list the vulnerable libraries that were loaded by the affected entity, e.g., by vendor name, product name and version.

Further an affected entity section 1507 may identify those topology entities that are most affected by the selected vulnerability. The here displayed affected entity section e.g., lists 24 services that are provided by processes (represented as the 3 vulnerable process groups mentioned in the affected entities detail section 1503) running on 3 host computing systems.

A portion of a topology model 153 of a monitored environment that also shows a vulnerability that was detected on an entity of the topology model is shown in FIG. 16.

The shown portion may be filtered 1610 to display only the subset of the topology model that is affected by a specific vulnerability issue (e.g., the vulnerability issue with vulnerability issue identifier 731 "972").

A specific entity 1605, on which a vulnerability was detected may currently be selected by a user of the monitoring system and in response to the selection, the monitoring system may display detail data 1611 of the vulnerability, a corresponding fix proposal 1612 and detail data describing the affected entity 1613.

The visualization 1600 of the topology model 153 may show a trust boundary 1601, entry points 1602 that expose the selected vulnerability to the public internet, topological connections 1603 and intermediate nodes 1604 via which external access is transferred to the vulnerable entity 1605, and topological connections 1606 and intermediate nodes (not shown) via which the affected entity accesses entities holding sensitive data 1607.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring vulnerabilities in a distributed computing environment, comprising:
    receiving, by a vulnerability identifier, vulnerability data, where the vulnerability data identifies one or more libraries affected by vulnerabilities, and identifies application programming interfaces (APIs) of the identified libraries which are affected by the vulnerabilities;
    detecting, by a library load sensor, loading of a given library by a monitored process running under an operating system of a host computer, where the library load sensor is injected into library loading functionality of the monitored process;
    in response to detecting the loading of the given library by the library load sensor, extracting, by the library load sensor, library data for the given library;
    determining, by the vulnerability identifier, whether the given library is vulnerable using the vulnerability data, where determining whether the given library is vulnerable includes comparing the library data for the given library with library data contained in the vulnerability data;
    detecting, by an API sensor, a given API that was called by the monitored process, where the given API resides in the given library and the API sensor is injected into the monitored process;
    determining, by the vulnerability identifier, whether the given API is affected by vulnerabilities using the vulnerability data;
    indicating, by the vulnerability identifier, a particular vulnerability of the monitored process in response to a determination that the given library is vulnerable and a determination that the given API is vulnerable; and
    receiving, by a vulnerability priority processor, a given topology entity on which the particular vulnerability was observed;
    retrieving a record for the given topology entity in a topology model, where the record represents the monitored process, and the topology model is defined as a graph with nodes representing entities in the distributed computing environment and edges representing communication between entities in the distributed computing environment;
    analyzing, by the vulnerability priority processor, connections between the given topology entity and other entities in the topology model, where the topology model identifies a subset of entities in the topology model that communicate with untrusted entities;
    calculating, by the vulnerability priority processor, a reachability priority score for the monitored process based on connections between the given topology entity and one or more entities that communicate with untrusted entities, where calculating the reachability priority score includes determining whether the connections of the topology model indicate that the monitored process is reachable from at least one untrusted entity; in response that topology model connections indicate no reachability, setting a reachability priority score indicating that the monitored process is not reachable from an untrusted entity; otherwise, setting a reachability priority score depending on a topological distance between the monitored process and the at least one untrusted entity.

2. The method of claim 1 further comprises
    determining, by the library load sensor, the library data for the given library, where the library data includes name of library, version of the library and a vendor associate with the library; and
    sending, by the library load sensor, the library data to a monitoring server, where the monitoring server is located remotely from the host computer.

3. The method of claim 2 further comprises
    determining, by the API sensor, call data for the given API, where the call data includes name of a method and name of a class; and
    sending, by the API sensor, the call data to the monitoring server.

4. The method of claim 3 wherein the vulnerability identifier resides on the host computer.

5. The method of claim 3 wherein the vulnerability identifier resides on the monitoring server.

6. The method of claim 5 further comprises
    receiving, by the vulnerability identifier, the vulnerability data;
    receiving, by the vulnerability identifier, the library data;
    comparing, by the vulnerability identifier, the library data to the vulnerability data; and
    generating, by the vulnerability identifier, a vulnerability issue report when the given library identified by the library data matches a library identified in the vulnerability data, where the vulnerability issue report identifies the given library loaded into the monitored process.

7. The method of claim 6 further comprises
    assigning, by a vulnerability priority processor, a vulnerability score to each vulnerability issue report, where the vulnerability score quantifies risk associated with the library identified in the vulnerability issue report; and
    presenting, by the vulnerability priority processor, one or more vulnerability issue reports on a display according to the vulnerability score associated with the vulnerability issue report.

8. The method of claim 7 further comprises
    receiving, by a call data processor residing on the monitoring server, call data for the given API executed by the monitored process, where the call data includes name of a method and name of a class; and updating, by the call data processor, the retrieved record with the call data.

9. The method of claim 8 further comprises retrieving, by the vulnerability processor, the record for the topology entity that represents the monitored process;

from the retrieved record, retrieving, by the vulnerability processor, call data for one or more APIs called by the monitored process;

for each of the one or more APIs, updating, by the vulnerability processor, the vulnerability issue report with the call data for the one or more retrieved APIs, where the library providing an API from the one or more retrieved APIs matches the library associated with the vulnerability report.

10. The method of claim 9 wherein assigning a vulnerability score further comprises calculating a usage priority score for the monitored process based on frequency the one or more APIs are called by the monitored process, and updating the vulnerability issue report with the usage priority score.

11. The method of claim 10 wherein assigning a vulnerability score further comprises analyzing, by the vulnerability priority processor, connections between the given topology entity and other entities in the topology model, where the other entities store sensitive data;

calculating, by the vulnerability priority processor, an access priority score for the monitored process based on connections between the given topology entity and the other entities in the topology model, where calculating the access priority score includes determining whether the connections of the topology model indicate that at least one of the other entities is reachable from the monitored process; in response that topology model connections indicate no reachability, setting an access priority score indicating that no other entity is reachable from the monitored process; otherwise, setting an access priority score depending on a topological distance between the monitored process and the at least one of the other entities.

12. The method of claim 1 further comprises instrumenting application code with a transaction sensor, where the transaction sensor executes within the monitored process and is configured to monitor a performance metric associated with execution of the application code.

13. The method of claim 12 further comprises receiving, by an in-process agent, a listing of instrumentation instructions, where the in-process agent is injected into the monitored process;

instrumenting, by the in-process agent, the monitored process with the load sensor and the transaction sensor; and instrumenting, by the in-process agent, the given API with the API sensor in accordance with a given instrumentation instruction from the listing of instrumentation instructions, where instrumenting the given API with the API sensor includes detecting loading of code by the monitored process, comparing a signature of an API contained in the loaded code with at least one API signature pattern contained in the listing of instrumentation instructions, and instrumenting the API sensor in response to a match of the API signature with the at least one API signature pattern.

14. The method of claim 13 further comprise analyzing, by the vulnerability identifier, the vulnerability data to create the listing of instrumentation instructions; and sending, by the vulnerability identifier, the listing of instrumentation instructions to the in-process agent.

15. A computer-implemented method for monitoring vulnerabilities in a distributed computing environment, comprising:

receiving, by a vulnerability processor executing on a monitoring server, vulnerability data, where the vulnerability data identifies one or more libraries affected by vulnerabilities, and identifies application programming interfaces (APIs) of the identified libraries which are affected by the vulnerabilities;

receiving, by the vulnerability processor, library data from a library load sensor instrumented into library loading functionality of a monitored process, where the library data identifies the monitored process and a given library loaded into the monitored process, such that the monitored process runs on a host computer located remotely from the monitoring server;

comparing, by the vulnerability processor, the library data from the library load sensor to library data contained in the vulnerability data;

generating, by the vulnerability processor, a vulnerability issue report when the given library identified by the library data matches a library identified in the vulnerable data, where the vulnerability issue report identifies the given library loaded into the monitored process; and receiving, by a vulnerability priority processor, a given topology entity on which a vulnerability was observed;

retrieving a record for the given topology entity in a topology model, where the record represents the monitored process, and the topology model is defined as a graph with nodes representing entities in the distributed computing environment and edges representing communication between entities in the distributed computing environment;

analyzing, by the vulnerability priority processor, connections between the given topology entity and other entities in the topology model, where the topology model identifies a subset of entities in the topology model that communicate with untrusted entities;

calculating, by the vulnerability priority processor, a reachability priority score for the monitored process based on connections between the given topology entity and one or more entities that communicate with untrusted entities, where calculating the reachability priority score includes determining whether the connections of the topology model indicate that the monitored process is reachable from at least one untrusted entity; in response that topology model connections indicate no reachability, setting a reachability priority score indicating that the monitored process is not reachable from an untrusted entity; otherwise, setting a reachability priority score depending on a topological distance between the monitored process and the at least one untrusted entity.

16. The method of claim 15 wherein the library data includes name of library, version of the library and a vendor associate with the library.

17. The method of claim 16 further comprises assigning, by a vulnerability priority processor, a vulnerability score to each vulnerability issue report, where the vulnerability score quantifies risk associated with the library identified in the vulnerability issue report; and presenting, by the vulnerability priority processor, one or more vulnerability issue reports on a display according to the vulnerability score associated with the vulnerability issue report.

18. The method of claim 17 further comprises receiving, by a call data processor residing on the monitoring server, call data for a given API executed by the monitored process, where the call data includes name of a method and a name of a class;

retrieving, by the call data processor, a record for a topology entity in a topology model, where the record represents the monitored process, and the topology model is defined as a graph with nodes representing entities in the distributed computing environment and edges representing communication between entities in the distributed computing environment; and updating, by the call data processor, the retrieved record with the call data.

19. The method of claim 18 further comprises retrieving, by the vulnerability processor, the record for the topology entity that represents the monitored process;

from the retrieved record, retrieving, by the vulnerability processor, the call data for one or more APIs executed by the monitored process;

for each of the one or more APIs, updating, by the vulnerability processor, the vulnerability issue report with call data for the one or more retrieved APIs, where the library providing an API from the one or more retrieved APIs matches the library associated with the vulnerability report.

20. The method of claim 19 wherein assigning a vulnerability score further comprises calculating a usage priority score for the monitored process based on frequency of the one or more APIs are called by the monitored process and updating the vulnerability issue report with the usage priority score.

21. The method of claim 20 wherein assigning a vulnerability score further comprises analyzing, by the vulnerability priority processor, connections between the given topology entity and other entities in the topology model, where the other entities store sensitive data;

calculating, by the vulnerability priority processor, an access priority score for the monitored process based on connections between the given topology entity and the other entities in the topology model, where calculating the access priority score includes determining whether the connections of the topology model indicate that at least one of the other entities is reachable from the monitored process; in response that topology model connections indicate no reachability, setting an access priority score indicating that no other entity is reachable from the monitored process; otherwise, setting an access priority score depending on a topological distance between the monitored process and the at least one of the other entities.

22. The method of claim 21 further comprising selecting, by the vulnerability priority processor, vulnerable API call records from the given topology entity, where transaction context data indicates the execution of the monitored API call in the context of a monitored transaction;

fetching, by the vulnerability priority processor, the transaction records that are identified by the transaction context data of the selected vulnerability API call records;

analyzing, by the vulnerability priority processor, the fetched transaction records to determine the number of transaction records that were initiated by a request that was received from an untrusted entity; and calculating, by the vulnerability priority processor, a transaction reachability priority score for the monitored process based on the number of fetched transactions that were initiated from an untrusted entity.

23. The method of claim 21 further comprising selecting, by the vulnerability priority processor, vulnerable API call records from the given topology entity, where transaction context data indicates the execution of the monitored API call in the context of a monitored transaction;

fetching, by the vulnerability priority processor, the transaction records that are identified by the transaction context data of the selected vulnerability API call records;

analyzing, by the vulnerability priority processor, the fetched transaction records to determine the number of transaction records that indicate the access of sensitive data; and calculating, by the vulnerability priority processor, a transaction access priority score for the monitored process based on the number of fetched transactions that indicate the access of sensitive data.

24. The method of claim 1 where extracting the library data for the given library includes determining a technology type for the monitored process, selecting a library identity evidence extraction configuration based on the technology type, and evaluating an extraction method defined in the library identity evidence extraction configuration to extract a portion of the library data.

* * * * *